US011012305B2

(12) United States Patent
Sividia et al.

(10) Patent No.: US 11,012,305 B2
(45) Date of Patent: May 18, 2021

(54) SYSTEMS AND METHODS FOR SERVICE MAPPING

(71) Applicant: ServiceNow, Inc., Santa Clara, CA (US)

(72) Inventors: Shlomi Sividia, Tel Aviv (IL); Dov Miron, Tel Aviv (IL); Noam Biran, Tel Aviv (IL); Tal Kapon, Tel Aviv (IL); Jesus Castro, Kirkland, WA (US); Bnayahu Makovsky, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 325 days.

(21) Appl. No.: 15/673,222

(22) Filed: Aug. 9, 2017

(65) Prior Publication Data
US 2019/0052531 A1    Feb. 14, 2019

(51) Int. Cl.
*G06F 15/16*    (2006.01)
*H04L 12/24*    (2006.01)
(Continued)

(52) U.S. Cl.
CPC ........ *H04L 41/0853* (2013.01); *G06F 9/5066* (2013.01); *G06F 9/5072* (2013.01);
(Continued)

(58) Field of Classification Search
CPC .............. H04L 41/0853; H04L 41/082; H04L 41/0873; H04L 41/50; H04L 47/70;
(Continued)

(56) References Cited

U.S. PATENT DOCUMENTS 5,812,780 A    9/1998  Chen et al.
6,609,122 B1   8/2003  Ensor
(Continued)

OTHER PUBLICATIONS

NPL2, "Troubleshoot Maps in Service Mapping", Dec. 11, 2015 https://docs.servicenow.com/bundle/helsinki-it-operations-management/page/product/service-mapping/task/t_TroubleshootingMapsServiceMapping.html.*

(Continued)

*Primary Examiner* — Oscar A Louie
*Assistant Examiner* — Messeret F Gebre
(74) *Attorney, Agent, or Firm* — Fletcher Yoder PC

(57) ABSTRACT

A system includes a non-transitory memory and one or more hardware processors. The hardware processors are configured to read instructions from the non-transitory memory to perform operations including generating a service mapping illustrating a plurality of discovered configuration items connected to a network and one or more connections between the plurality of discovered configuration items, wherein at least one of the plurality of discovered configuration items comprises a virtual platform server, receiving input data from the generated service mapping associated with the virtual platform server, wherein the input data indicates one or more manual configuration item additions, validating the input data of the one or more manual configuration item additions, update the service mapping to include the one or more manual configuration item additions, generating a specified number of tasks to be performed by the service mapping, and determining an amount of time for the updated service mapping to respond to the set number of tasks.

19 Claims, 22 Drawing Sheets

(51) Int. Cl.
*H04L 12/911* (2013.01)
*G06F 9/50* (2006.01)
*G06F 9/54* (2006.01)
*H04L 12/26* (2006.01)

(52) U.S. Cl.
CPC ........ *H04L 41/082* (2013.01); *H04L 41/0873* (2013.01); *H04L 41/50* (2013.01); *H04L 47/70* (2013.01); *G06F 9/54* (2013.01); *H04L 41/0213* (2013.01); *H04L 41/0893* (2013.01); *H04L 43/0823* (2013.01)

(58) Field of Classification Search
CPC ............. H04L 41/0213; H04L 41/0893; H04L 43/0823; G06F 9/5066; G06F 9/5072; G06F 9/54
USPC ........................................................ 709/223
See application file for complete search history.

(56) References Cited

U.S. PATENT DOCUMENTS

| | | | |
|---|---|---|---|
| 6,968,535 B2 | 11/2005 | Stelting et al. | |
| 7,028,301 B2 | 4/2006 | Ding | |
| 7,062,683 B2 | 6/2006 | Warpenburg | |
| 7,131,037 B1 | 10/2006 | LeFaive | |
| 7,160,864 B2 | 1/2007 | Matharu | |
| 7,219,124 B2 | 5/2007 | Cerami et al. | |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,226,096 B2 | 9/2012 | Navarrete | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 9,239,857 B2 | 1/2016 | Trinon | |
| 9,535,737 B2 | 1/2017 | Joy | |
| 9,557,969 B2 | 1/2017 | Sharma | |
| 9,792,387 B2 | 10/2017 | George | |
| 2009/0240510 A1* | 9/2009 | Hopkins | G06Q 10/06 705/1.1 |
| 2009/0327630 A1* | 12/2009 | Akamatsu | G06F 11/1451 711/162 |
| 2010/0179945 A1 | 7/2010 | Rangarajan et al. | |
| 2011/0238691 A1* | 9/2011 | Gere | H04L 41/0856 707/769 |
| 2012/0166485 A1 | 6/2012 | Tashiro et al. | |
| 2013/0046739 A1* | 2/2013 | Waschke | G06F 16/10 707/691 |
| 2014/0215487 A1* | 7/2014 | Cherkasova | G06F 9/5083 718/106 |

OTHER PUBLICATIONS

NPL1, "Check Mapping Results and Edit Maps", Aug. 8, 2016 https://docs.servicenow.com/bundle/geneva-it-operations-management/page/product/service_mapping/task/t_CheckMappingResults.html.*
NPL3, "Create and Delete Configuration Items", Jun. 28, 2013.*
Youtube_Transcript, Nov. 25, 2015.*
W. Han and Y. Park, "Mapping the relations between technology, product, and service: Case of Apple inc.," 2010 IEEE International Conference on Industrial Engineering and Engineering Management, Macao, 2010, pp. 127-131. (Year: 2010).*
Wang, H., & Wang, S. (2014). Ontological map of service oriented architecture for shared services management. Expert Systems with Applications, 41(5), 2362-71. (Year: 2014).*
R. Kwak, Hakyeon Lee and Y. Park, "On the construction of a service map: How to match the service features and the customer needs," 2010 International Conference on Networking and Information Technology, Manila, 2010, pp. 298-302. (Year: 2010).*
Partial Search Report from European Patent Application No. 18188049.3 dated Feb. 20, 2019; 17 pgs.

* cited by examiner

SYSTEMS AND METHODS FOR SERVICE MAPPING

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. As networks become more complex, network maintenance and management becomes a more resource intensive task.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, store, and distribute information. Graphical-user-interfaces (GUIs) may provide interactive objects for viewing and manipulation by a user that may facilitate usage of this data. As GUIs become increasingly complex, it may be more difficult to discern certain characteristics of the GUIs' interactive objects.

With this in mind, an IT system may include service mapping logic that generates an accurate, service-aware view (e.g., a "service mapping") of the system infrastructure that is frequently refreshed, keeping the view up to date. The service mapping may be constructed by discovering and mapping relationships between IT components running specific services. The service mapping logic may monitor the IT infrastructure for service-affecting changes and update the service mapping in real-time. The service mapping may provide a mix of applications and IT components that support a service and provide an understanding of how these applications and components are related.

The disclosed techniques enable a user to better maintain and manage a network of components. Specifically, the disclosed techniques enable a user to customize the service mapping of a network architecture by adding additional configuration items (CIs) and connections manually, reviewing and addressing errors that arise during discovery via a single interface, and performing scalability testing to make a determination as to the performance capabilities of the network. By enabling the addition of manually added CIs and connections between CIs, a hybrid service map may be created that includes both automatically discovered components (e.g., CIs and connections) and manually added components. Once the data representing the manually added CIs and connections have been received, the data is validated and the service map is updated to reflect the manually added components. In some embodiment, validating the data may help to reduce errors that arise in discovery. If the manually added components arise during discovery, duplicate components may be reconciled. That is, the system may recognize which CIs were manually added and only display a single icon, rather than one icon for the manually added CI and a second icon for a discovered instance of the same CI. With regard to discovery error review and resolution, errors may be grouped into categories, groups, and subgroups. A user may navigate the nested categories, groups, and subgroups via a single interface, reviewing the errors and taking remedial action to address the errors. Scalability testing may be used determine the scalability of the network, to identify bottlenecks in the network, to identify one or more slow queries, etc. As such, by determining the amount of time for the network to respond to a set number of tasks, distributed over various types of tasks, may help to make determinations as to the performance of the network. This information may then be used to determine what, if anything, may be done to improve the performance of the network.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION

Figure 1:
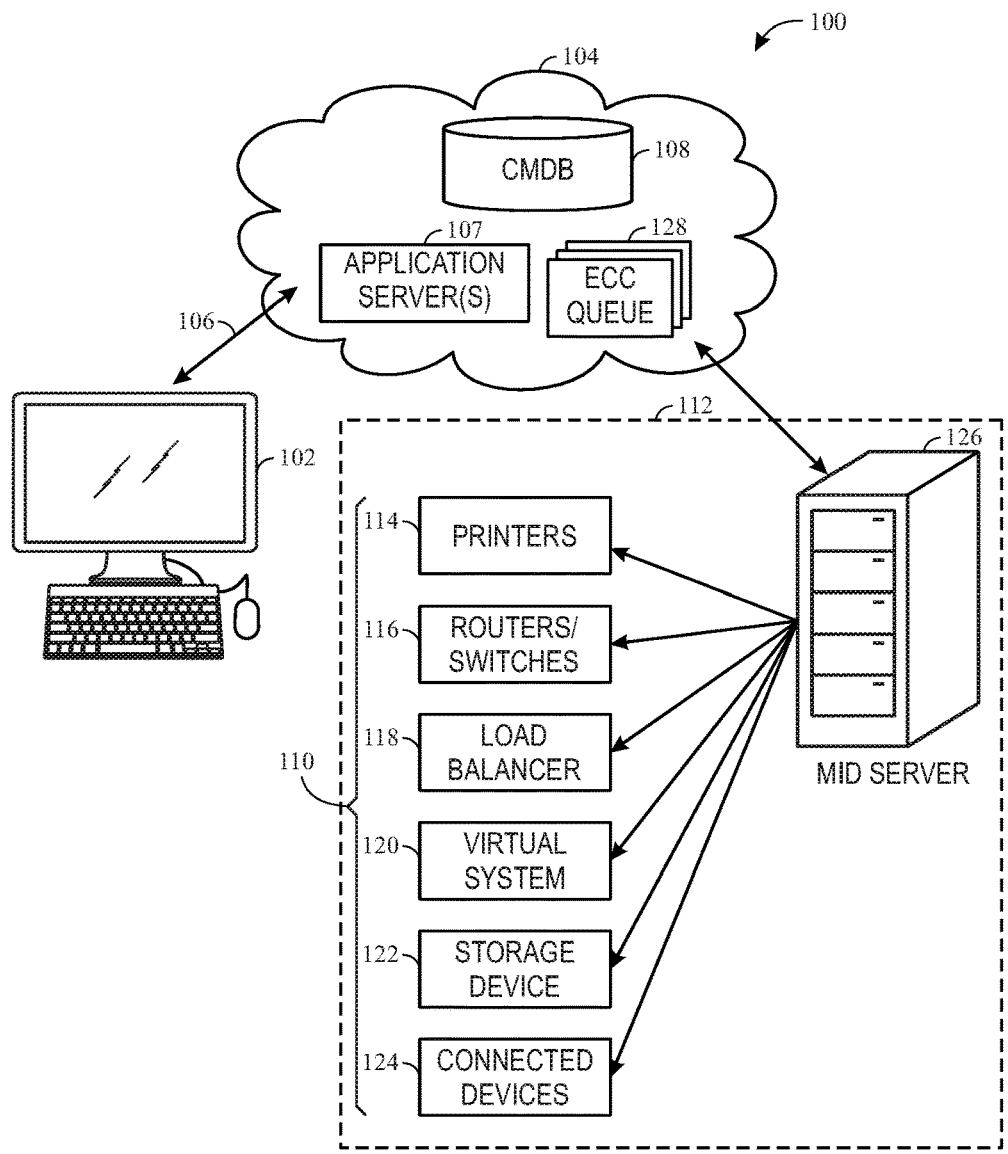
FIG. 1 is a block diagram of a distributed computing system utilizing a cloud service and a configuration management databases (CMDB), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various electronic devices are interconnected within a distributed context. As more and more functions are performed by services using some form of distributed computing, the complexity of IT network management increases. As these devices are separated geospatially, managing and tracking configuration of these devices may become more difficult.

In such an interconnected but distributed context, the configuration of each of these devices may be represented by configuration items (CIs) that detail certain configurations, parameters, components, software, or settings associated with a respective device. As will be discussed in greater detail below, CIs may include information related to a physical entity (e.g., hardware), a logical entity (e.g., version, instance of a database), a conceptual entity (e.g., a service or license), and the like associated with a respective device. Given the wide variety of CIs associated with various devices within this type of complex IT environment, configuration item (CI) discovery executed on a given infrastructure is used to track the CIs of the devices that are present on the connected IT environment. That is, CI discovery is the process of finding configuration items, such as hardware, software, documentation, location, and other information related to the devices connected to a given network, such as an enterprise's network. This discovery process may be performed at least partially using automated routines, e.g., an application program or probe, running on the network in question. When a CI is identified by such routines, discovery includes exploring some or all of the CI's configuration, provisioning, and current status. This explored information may be used to update one or more databases, such as a configuration management database (CMDB), accordingly.

The CMDB stores and tracks all of the discovered devices connected to the network. On computer systems, the discovery process may also identify software applications running on the discovered devices, and any connections, such as Transmission Control Protocol (TCP) connections between computer systems. Discovery may also be used to track all the relationships between computer systems, such as an application program running on one server that utilizes a database stored on another server. CI discovery may be performed at initial installation or instantiation of connections or new devices, and/or CI discovery may be scheduled to occur periodically to track additions, removals, or changes to the IT devices being managed, thereby keeping data stored on the CMDB current. Thus, using the discovery process, an up-to-date map of devices and their infrastructural relationships may be maintained.

Information technology (IT) networks may include a large number of resources, such as servers, applications, and/or other hardware devices. Each of these devices may have one or more corresponding configuration files that control how the asset functions. These configuration files may facilitate discovery of the corresponding devices.

By way of introduction, FIG. 1 is a block diagram of a system 100 that utilizes distributed computing framework, which may perform one or more of the techniques described herein. As illustrated in FIG. 1, a client 102 communicates with a platform 104, e.g., a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs capable of running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together and communicate using one or more networks. For instance, the platform 104 may be a cloud service platform that includes various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionalities, such as gateways, routers, load balancers, databases, application servers running application programs on one or more nodes, or other devices that may be accessed via the platform 104. For example, the client 102 may connect to an application server 107 and/or databases, such as the configuration management database (CMDB) 108, via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the CMDB 108).

The CMDB 108 is a series of tables containing information about all of the assets and enterprise services controlled by a client 102 and the configurations of these assets and services. The assets and services include configuration items (CIs) 110 that may be computers, other devices or hardware on a network 112 (or group of networks), software contracts and/or licenses, or enterprise services. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and/or the like. The CMDB 108 may include an index of CIs 110, attributes (e.g., roles, characteristics of elements, etc.) associated with the CIs 110, and/or relationships between the CIs 110. Furthermore, the CMDB 108 may track which configuration files identified pertain to each CI 110.

Additional to or in place of the CMDB 108, the platform 104 may include one or more other database servers. The database servers are configured to store, manage, or otherwise provide data for delivering services to the client 102 over the communication channel 106. The database server includes one or more databases (e.g., CMDB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely, such as at a client site.

In the depicted topology, access to the platform 104 is enabled via a management, instrumentation, and discovery (MID) server 126 via a communication queue 128, such as an External Communications Channel (ECC) Queue. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

As discussed below, the MID server 126 may periodically and/or intermittently use discovery probes to determine information on devices connected to the network 112 and return the probe results back to the platform 104. Probes may have different types and functions. For example, some probes may identify devices running specific operating systems (e.g., Windows or Linux) while other exploration probes may return disk information for those devices using the operating systems. Some probes run a post-processing script to filter the data that is sent back to the platform 104.

As a non-limiting example, the probe types available for use by the MID server 126 may include a Common Information Model (CIM) probe that utilizes the CIM query language to query a CIM server using Web-Based Enterprise Management (WBEM) protocols, a Simple Network Manage Protocol (SNMP) probe to discover information about network device (e.g., routers), a Windows Management Instrumentation (WMI) Runner probe that uses the WMI to obtain information about a Windows-based device, a Powershell probe that executes Powershell scripts (e.g., Powershell V2 scripts) on a host for the MID server 126, a Secure Copy (SCP) Relay Probe that copies a file or directory contents from one host to another via the MID server 126, a Secure Shell (SSH)-based probe that executes a shell command on a target host and returns the output, a Shazzam probe that determines what devices are active using a targeted port scan, a user-defined probe class, a multi-probe that combines probe types, and/or any combination thereof.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication queue 128 may be a database table that is typically queried, updated, and inserted into by other systems. Each record in the communication queue 128 is a message from an instance in the platform 104 to a system (e.g., MID server 126) external to the platform 104 that connects to the platform 104 or a specific instance running in the platform 104 or a message to the instance from the external system. The fields of a communication queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message. The agent field identifies a name (e.g., mid.server.xxxx) of the external system that the message is directed to or originates from. The topic field is a value (e.g., arbitrary values) that indicates that a message pertains to a particular subject. For example, during discovery of CIs 110, the topic field may be populated with a value to identify a name of the probe that has been/is going to be run. The name field provides more detail in a context indicated by the topic field. For example, in discovery, the name field may be a descriptive and human-readable name or a command to be run by the probe identified in the topic field. Alternatively, if the topic field contains "SSHCommand", the name field may indicate the shell command to be run.

The source field indicates a target or recipient of the message outside of the platform 104. In discovery, the source field may contain an Internet Protocol (IP) address that the discovery probe is to be/has been run against, or the field may include a human-readable description when the probe is to be/has been run against multiple IP addresses.

The response to field, when included, contains a reference (e.g., sys_id) to the communication queue 128 that the message is a response to. In discovery, a discovery result may be a response to a discovery schedule message.

The queue field indicates whether the message is incoming to the platform 104 or outgoing from the platform 104. The state field indicates whether the message is ready to be processed, is being processed, or has been processed. The recipient of the message generally updates this field. The time created field indicates when the record was first stored in the communication queue 128. The time processed field indicates when the record was updated to processed.

In some embodiments, the messages are sequenced using a sequencing field that includes a number assigned at generation of the record. The error string field, when included, indicates that an error occurred and/or a type of error that occurred.

The payload field is the body of the message. The contents of this field are specific to the context of the record and the system that is exchanging information with the platform 104. For example, a result of a discovery probe may use Extensible Markup Language (XML) documents for the payload. For instance, in some embodiments, the returned) ML document may have a root tag of  containing one or more <result> tags and a single <parameters> tag. The parameters are simply an echo of those sent to the MID server 126 in the probe.

Although the system 100 is described as having the application servers 107, the CMDB 108, the ECC queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the platform 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
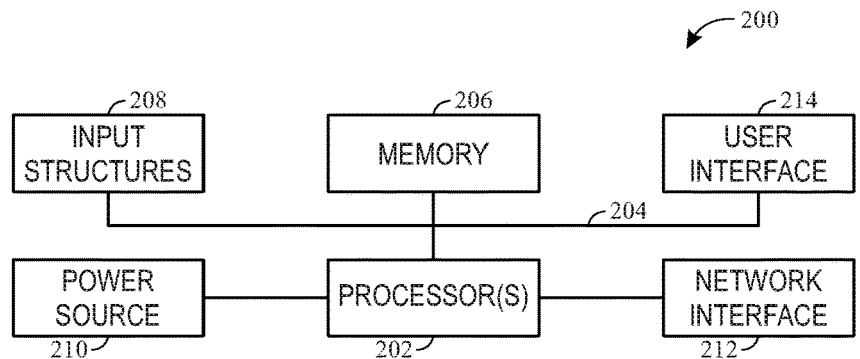
FIG. 2 is a block diagram of a generalized computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., CMDB 108), other servers in the platform 104 (e.g., server hosting the ECC queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other suitable circuitry performing functions by executing instructions stored in the memory 206 or in an otherwise accessible location. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 include suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units of the same or different types in one or more physical locations. The one or more processor 202 may access data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, haptic feedback, and the like.

Figure 3:
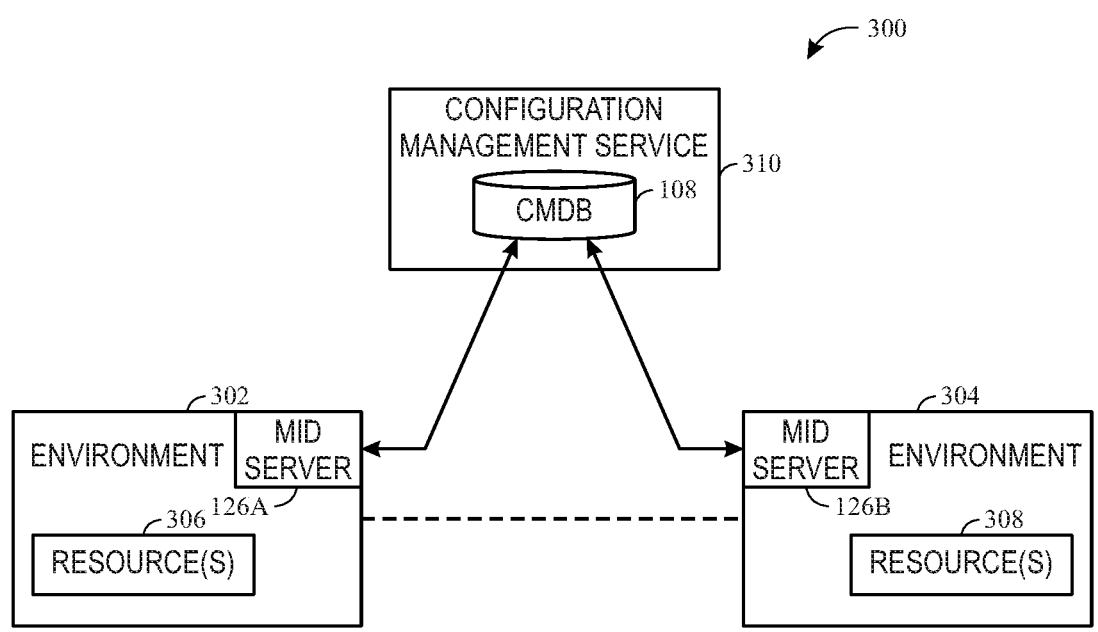
FIG. 3 is a block diagram of an electronic computing and communication system that utilizes the CMDB of FIG. 1, in accordance with an embodiment.

FIG. 3 is a block diagram of an embodiment of an electronic computing and communication system 300 for discovering and/or managing connected configuration items. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping.

For example, the environments 302, 304 may include a customer service environment used to represent customer service infrastructure in a technical support, sales, billing, and/or other groupings. Similarly, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account including resources that may be spatially distant from each other. In some embodiments, resources 306, 308 of the environments 302, 304 may communicate with each other across environments. However, in some embodiments, aspects of various environments may be provided by different vendors without communication there between. In such embodiments, the resources of disparate environments may communicate using the platform 104 (e.g., a configuration management service 310 that is a part of a cloud service platform 104 including the CMDB 108). The resources 306 and 308 may include any suitable configuration item 110 previously discussed.

The configuration management service 310 may include one or more servers providing access to and managing the CMDB 108. The configuration management service 310 may allocate or provision resources, such as application instances in the resources 306 or 308 from a respective environment 302 or 304. Further, the configuration management service 310 may create, modify, or remove information in the CMDB 108 relating to the resources 306 or 308. Thus, the configuration management service 310 may manage a catalogue of resources in more than a single environment (even if the environments may not directly communicate with each other). Using this catalogue, the configuration management service 310 may discover new resources, provision resources, allocate resources, modify, and/or remove resources from the catalogue across a single environment or multiple environments. In some embodiments, these actions may be initiated as part of an operation executed on a client 102, may be scheduled for periodic occasions (e.g., periodic discovery), or may be a combination thereof. For example, a client 102 may receive a request, via its input structures, to query an identity of an application program interface (API) used by a resource to access a particular vendor/provider for the environment 302 that is passed to the configuration management service 310 to query the CMDB 108. As another example, the client 102 may receive a request, via its input structures, to query an identity of a user authorized to access a particular resource that is passed to the configuration management service 310.

As previously discussed, the CMDB 108 may be populated utilizing a discovery process which may be used to discover the resources 306 or 308. Moreover, as previously discussed, the discovery process may include determining the properties or attributes of the resources 306 or 308 in their respective environments 302 or 304 using a respective MID server 126A or 126B. In the illustrated embodiment, each environment 302 and 304 has its own MID server 126A and 126B. In some embodiments, a single MID server may be employed when the MID server may reach into multiple environments. For example, if the MID server is run in the platform 104 (e.g., in the configuration management service 310), a single MID server may be used to manage both environments 302 and 304. Additionally or alternatively, if the MID server 126A has access to the environment 304, the MID server 126B may be omitted.

As previously discussed, each discovered resource is identified as a configuration item 110 with a record stored in the CMDB 108 including data indicating properties, attributes, dependencies, or other information about the resource. The CMDB 108 may be encoded, for example, as a relational database management system (RDBMS); an object-oriented database (e.g. an XML database); a network model database; or a flat-file database.

Figure 4:
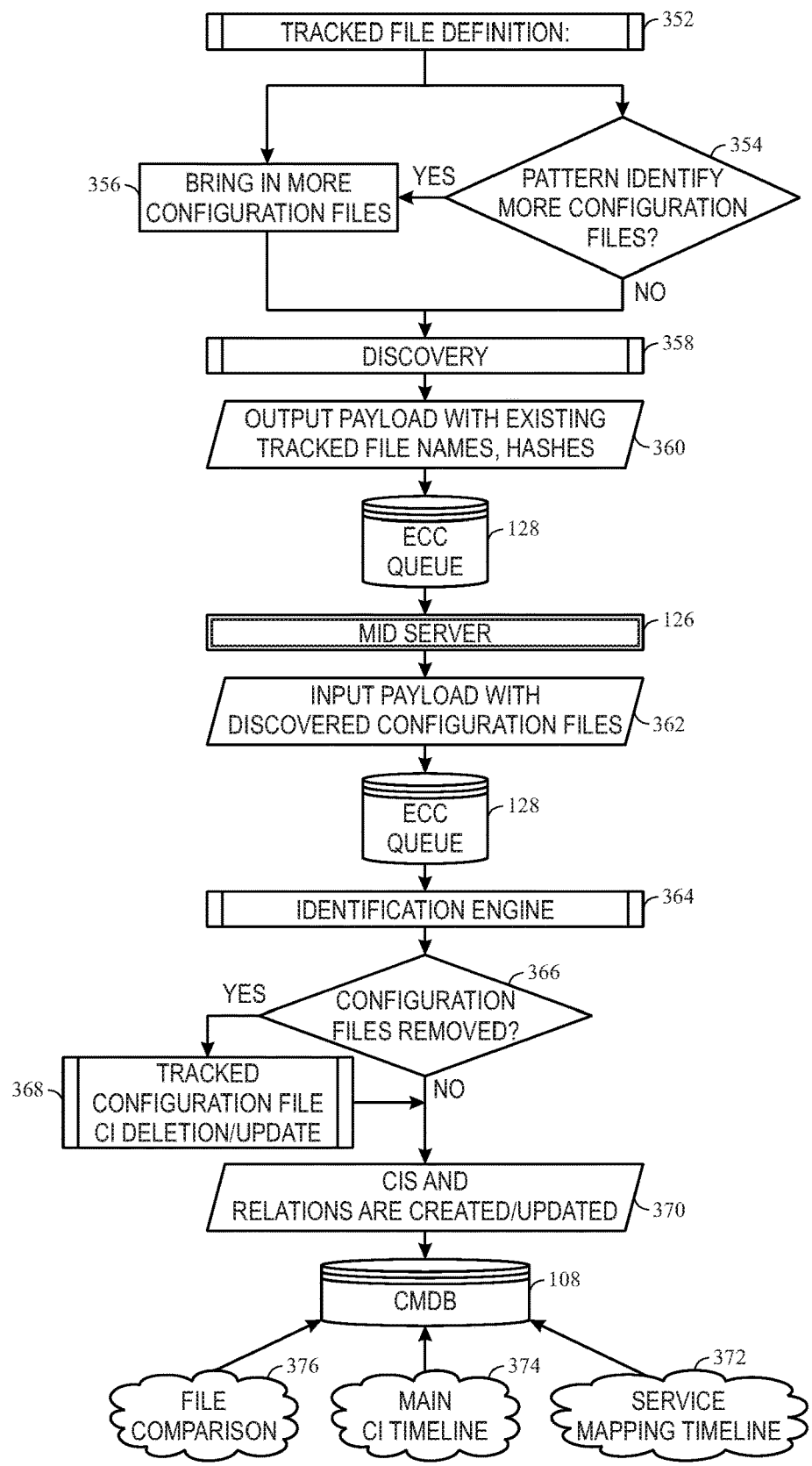
FIG. 4 is a block diagram illustrating a process for tracking configuration files utilizing a discovery server, in accordance with an embodiment.

As may be appreciated, over time, configuration files used by the CIs 110 may change. As previously noted, in systems with multiple CIs 110 it may be difficult and/or time-consuming to examine the configuration files to determine where or when changes are made to various files. FIG. 4 illustrates a flow diagram of an implementation of a CI 110 discovery process using a configured or specified definition. In this example, a tracked file definition 352 is submitted via the client 102 or another location. The tracked file definition 352 defines how to find the configuration file(s) to be tracked and/or other information about the file. The tracked file information may include, but is not limited to, the information listed below in Table 1.

"/conf/*.xml" for one or more CI types (e.g., Apache Tomcat service). As noted, the file definition may include wildcards (e.g., *) that enable returning multiple files that satisfy the remaining search criteria in the definition. Furthermore, as noted, the file definition may include resolvable units. For example, the resolvable units may include variables (e.g., "$install_directory" for the install directory) that may be resolved differently for different applications and/or different servers. The resolvable units may also include functions (e.g., "+" for concatenate) to indicate how resolvable units and other portions of the pattern interact. These resolvable units may be resolved in some embodiments by storing the file path expression in a similar format (e.g., Neebula Discovery Language) used for discovery to enable resolution during discovery. Additionally or alternatively, the tracked file definition 352 may include a path to a CI 110, and the configuration files may be discovered during discovery.

Some definitions may identify more configuration files. For example, a pattern to be input as a definition may include an identification section that may be used to identify other configuration files. The platform 104 or the client 102 determines whether the pattern includes additional configuration files (block 354). If additional files are to be included, the platform 104 brings in the additional configuration files to be included (block 356). The platform 104 then performs discovery on a location (e.g., IP address, network, etc.) using the pattern including a file path to discover configuration files satisfying criteria in the pattern (block 358). As part of the discovery, an outgoing payload 360 including the list of tracked file names/locations to be discovered is passed from platform 104 to the MID server 126 via the communication queue 128. In some embodiments, as a preparation, the platform 104 resolves variables in the tracked file definition. Additionally or alternatively, the MID server 126 may resolve the variables. For example, regardless of where the variables are resolved, if an install directory is located at "/tomcat/" in the example discussed above. The file path expression is changed to "/tomcat/*.xml". As discussed below in reference to FIG. 5, the MID server126 acts upon the payload to discover the configuration files.

TABLE 1

Tracked file information

| Field name | Label | Type | Description |
| --- | --- | --- | --- |
| file_path | File Path | String | Configuration files path expression |
| pattern | Discovery Pattern | Reference | Additional attributes - OS, run order, etc. |
| ci_type | CI Type | Table name | Type of device for the associated CI |
| save_content | Save Content | Boolean | Provides the option to decide whether to save the content of the files under the indicated path |
| active | Active | Boolean | Indicates whether the tracking is active. |

Although each tracked file information entry may include a flag of whether the content is tracked (e.g., active field), in some embodiments, a user may globally enable and/or disable tracking for configuration files. For example, when the user wants to limit memory consumption, the user may disable configuration file tracking. For instance, in this example the tracked file definition 352 includes a file path that indicates where one or more configuration files may be located. In some embodiments, this file path may include an identifier for a device (e.g., IP address) or may be pointed at a particular device with no IP address in the file path. For example, the file definition may include "$install_directory+

The discovered configuration files are then used to populate/add to a list of discovered file names. For example, if a "server.xml" is discovered within the "/tomcat/" install folder, an entry for a tracked file name "/tomcat/server.xml" is created. A single pattern may result in a single entry or may result in multiple entries. For example, if the install directory included multiple XML files, each XML file may be discovered. An input payload 362 including the discovered file names is passed to the platform 104 from the MID server 126 via the communication queue 128.

These discovered file names are then passed to an identification engine 364 that marks the files as tracked in the CMDB 108. For example, an additional identifier (e.g., metadata) about the CI 110 and/or its configuration files may be added as a new CI or added to a current CI. In other words, the configuration file may be stored as its own CI. In some situations, a current CI may be updated to change an indicator (e.g., metadata flag) to indicate that the file is to be tracked when the configuration file already has a CI generated in the CMDB 108.

Since tracking files consumes resources (e.g., memory and processing), the platform 104 may determine whether a configuration file should be removed. (block 366). If the configuration file was not discovered (e.g., has been deleted) at the file path in the definition, the CI created from the configuration file is deleted (block 368).

The CIs 110 (including newly created configuration file CIs) and relations in their entries 370 along with tracked flags are sent to the CMDB 108. The entries in the CMDB 108 may include contents and/or a hashing of the content. For example, the entries may include additional fields, such as those listed in Table 2, to enable file tracking.

If one or more configuration files are found, the MID server 126 may begin to resolve external files (block 390). In some embodiments, the resolution of external files may occur when the external files are called by the platform 104. If external files are identified in the pattern (block 391), the MID server 126 resolves the file paths and joins the external file paths with the file paths defined inside the pattern (block 392).

Whether external file paths are resolved or no external file paths are identified, the MID server 126 fetches the file information including information about file content (e.g., actual content, hashed checksum of content, etc.) (block 393). When a hashed checksum is used, the checksum content may be calculated from suitable metric or metrics, such as the file content size plus a value of maximum file size and a save_content flag indicating whether the information should be saved. Alternatively, the hashed checksum may be calculated from the file size plus the last modification time and a value of the maximum file size and the save_content flag. Alternatively, the checksum may be any

TABLE 2

Tracking configuration files fields in a CI entry

| Field name | Label | Type | Description |
| --- | --- | --- | --- |
| content | File Content | Compressed Data | Contents of the configuration file identified |
| hash | Hash | String | Checksum used by the MID server 126 to determine whether a change has occurred |
| last_modified | Last Modified | Glide Date Time | Most recent modification date and time on the server |
| file_size | File Size | Long | File size in Bytes |

The contents in the configuration file CIs are added to the CMDB 108 to enable tracking. In some embodiments, the contents of the configuration files are compressed before storage as CIs in the CMDB 108. Regardless, as discussed below, the contents in the CMDB 108 may be accessed via a service mapping timeline 372, a CI timeline 374, and/or file comparison user interface (UI) 376.

In some embodiments, an application programming interface (API), such as a Representational State Transfer (REST), may be used to fetch all tracked file definitions. The API may be used during synchronization of tracked file definitions with the MID server 126. Access to these files may be divided into administrators, middle authorities, and users groups, such that one or more groups (e.g., users group) does not have access to the tracked file definitions via the API.

Figure 5:
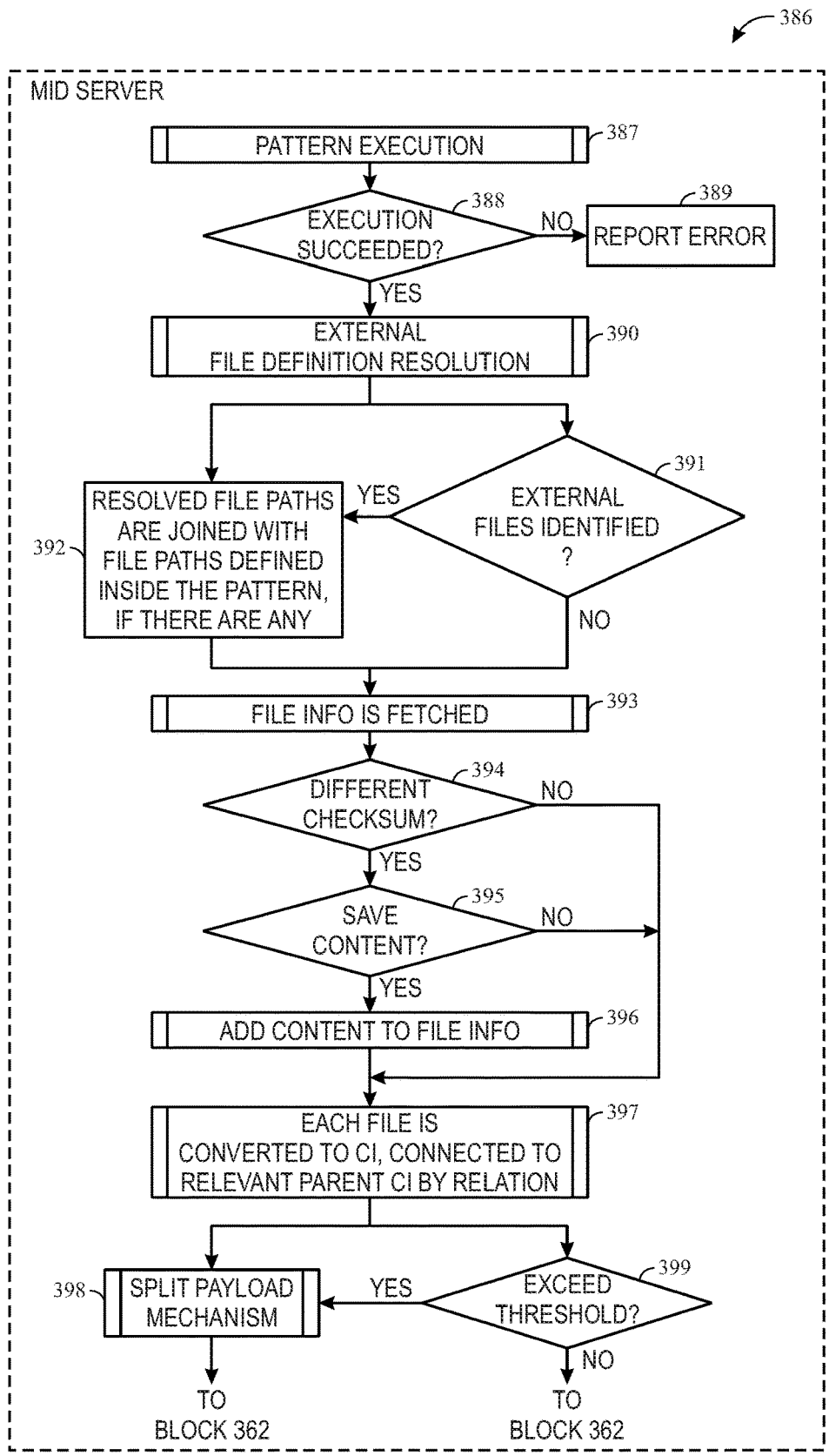
FIG. 5 is a block diagram illustrating a process within the discovery server of FIG. 4 for tracking configuration files, in accordance with an embodiment.

FIG. 5 illustrates a process 386 that may be performed within the MID server 126. The MID server 126 receives the pattern 387 in the payload 360. In some embodiments, the MID server 126 may be synchronized with file definitions/patterns at startup of the MID server 126. A business rule may be used to determine when each insertion or modification of a definition record is synchronized during uptime of the MID server 126.

The MID server 126 discovers whether one or more configuration files satisfy the criteria of the pattern (block 388). If no configuration files satisfy the criteria or the discovery fails for some other reason (e.g., credentials used unable to access the configuration file), the MID server 126 reports the failed discovery (block 389). This reported error may later cause deletion of the CI corresponding to the configuration file from the CMDB 108, as previously discussed.

hashed value of the content suitable to indicate whether the content of the configuration file has changed. The MID server 126 compares this file information to previous file information to determine whether the content of the file has changed (block 394). For example, the illustrated embodiment includes a checksum compared to a previous checksum. If the checksum has changed, the MID server 126 also determines whether the content is to be saved to the configuration file info (and later the corresponding CI) (block 395). If the checksum has changed and the content is to be saved, the MID server 126 adds the content to the file information (block 396). The MID server then converts each file to a CI by including appropriate metadata information including connections to relevant parent CIs (block 397).

In some embodiments, the MID server 126 may determine whether the converted CIs with content surpass a payload size threshold (block 399). When the payload exceeds the payload size threshold, the MID server 126 splits the payload into multiple payloads (block 398). These multiple payloads are passed to the communication queue 128 and the identification engine 364 sequentially.

FIGS. 6-10 include screens of an embodiment of user interfaces (UI) that may be used with the systems and methods disclosed herein.

Pattern Designer UI

Figure 6:
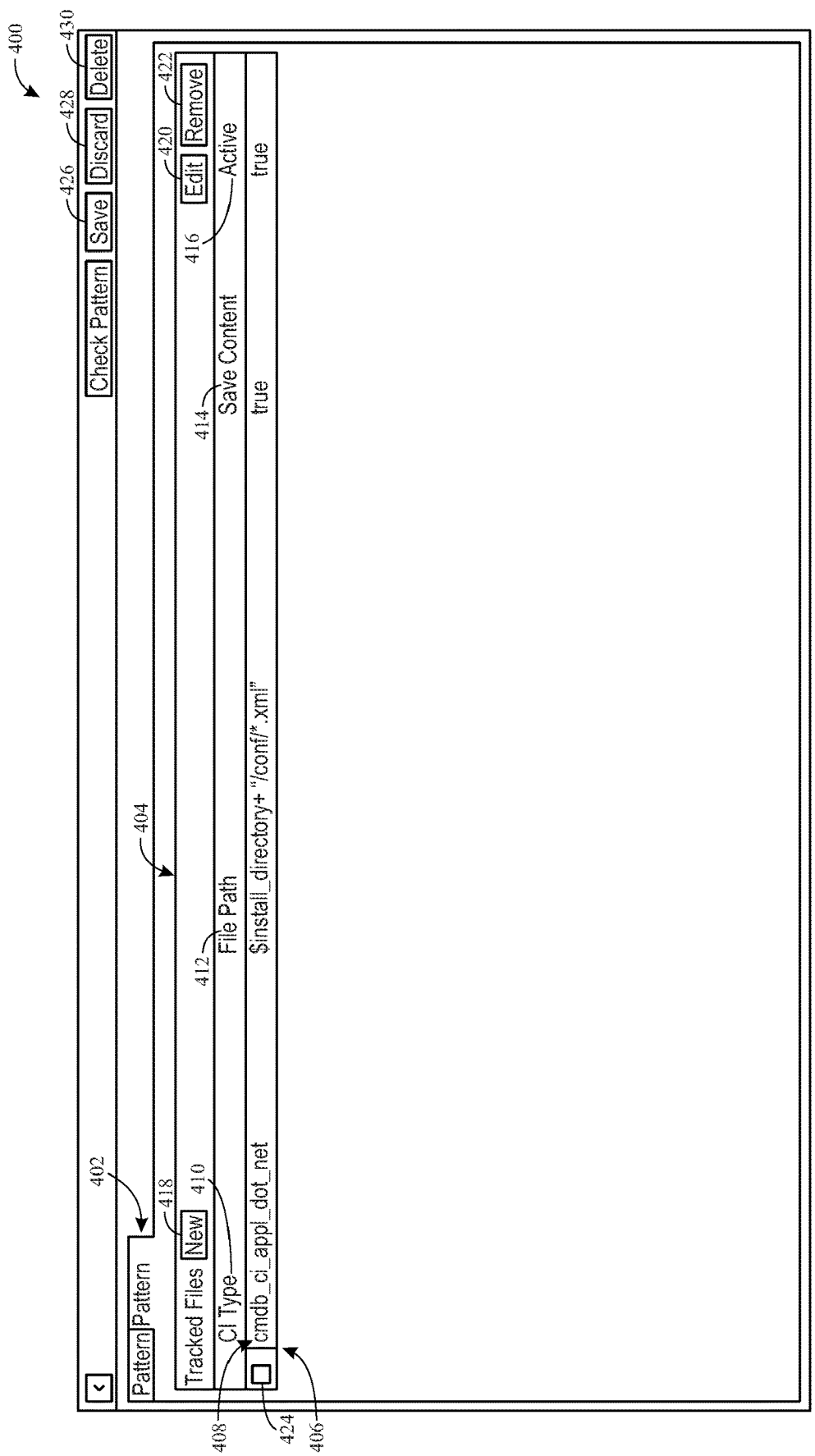
FIG. 6 shows a screen that may be used to access currently tracked file entries and/or create new configuration file tracking entries in a pattern designer for designing patterns for future discovery processes, in accordance with an embodiment.

FIG. 6 shows a screen 400 that may be used to access currently tracked file entries and/or create new configuration file tracking entries in a pattern designer for designing patterns for future discovery processes. As illustrated, the screen 400 includes navigation tabs 402. The navigation tabs 402 enable selection of a pattern viewing screen or a tracked files screen. In the illustrated embodiment, an embodiment of a tracked file screen 404 is presented. Within the tracked file screen 404, a list 406 of tracked files is presented. The illustrated embodiment of the list 406 includes only a single entry 408 while some embodiments may include any number of entries. For each entry in the list 406, a CI Type column 410 that indicates a type of CI corresponding to criteria for the tracked configuration file, a file path column 412 that indicates the file path to the tracked configuration file corresponding to the entry, a save content column 414 that indicates whether content of the configuration file is saved in the CI, and an active column 416 that indicates whether the tracked configuration file is actively being tracked.

The tracked file screen 404 also includes a create entry button 418. Upon selection of the create entry button 418, the screen 400 presents a create file tracking entry creation box, discussed below. Existing entries may be edited or removed using an edit entry button 420 or a remove entry button 422, respectively. In some embodiments, the edit entry button 420 may bring up a file tracking entry edit box that is similar to the create file tracking entry creation box. Additionally, removal of multiple entries may be made simultaneously by selecting a selection box 424 for each respective entry to be removed and clicking the remove entry button 422.

Changes made to the pattern including the tracked configuration file criteria may be saved or discarded using a pattern save button 426 or a pattern change discard button 428. Additionally or alternatively, the pattern may be deleted entirely using a delete button 430.

Comparison Screen UI

Figure 7:
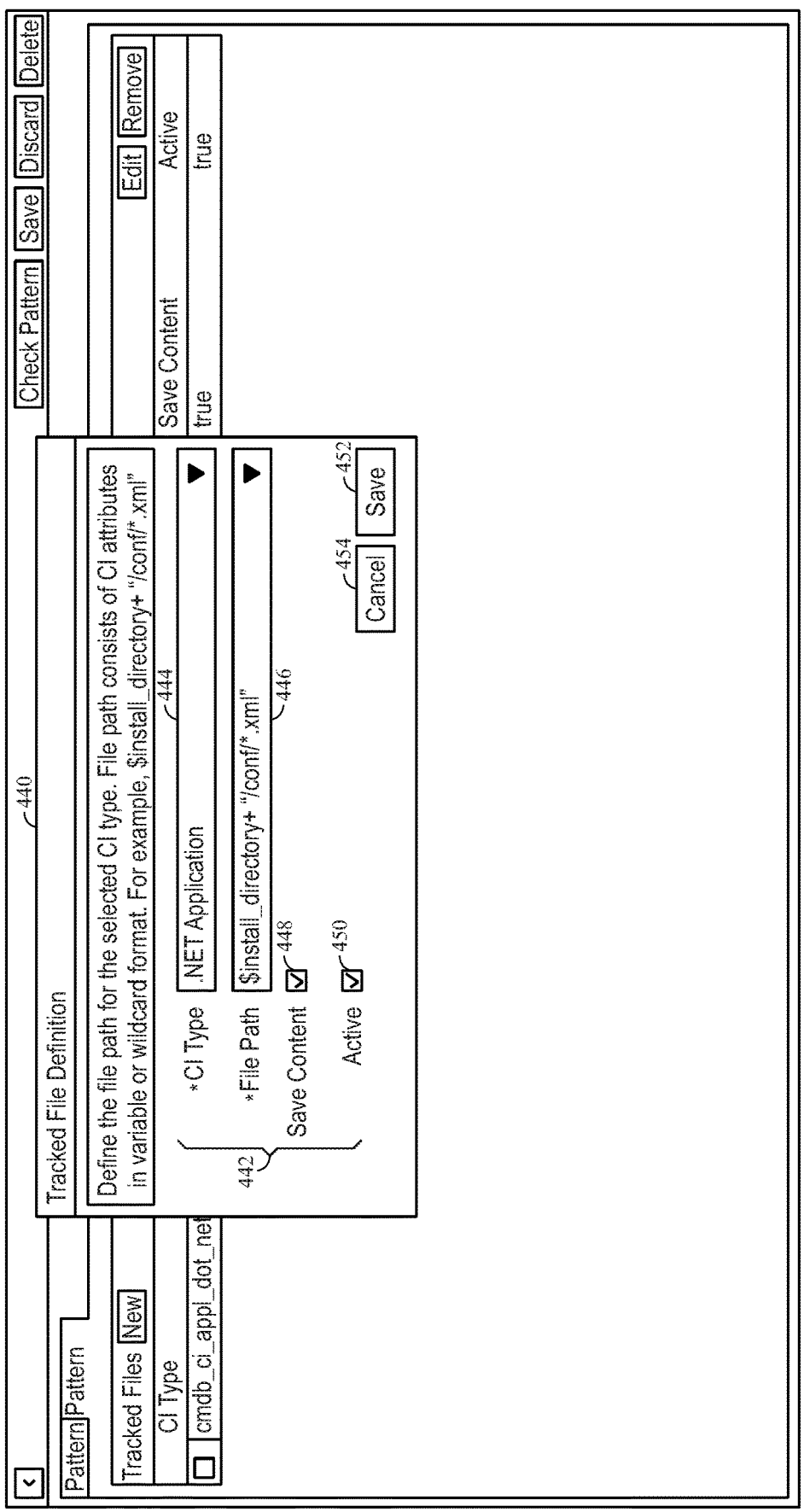
FIG. 7 illustrates a tracked file definition box overlaid on the screen of FIG. 6, in accordance with an embodiment.

FIG. 7 illustrates a tracked file definition box 440 overlaid on the screen 400. The tracked file definition box 440 may be accessed using the new create entry button 418 and/or the edit entry button 420. When the tracked file definition box 440 is opened for an existing entry via the edit entry button 420, fields 442 of the tracked file definition box 440 are filled when opened. The tracked file definition box 440 includes fields 442. Each field 442 may correspond to a column in the tracked file screen 404. In the illustrated embodiment, the fields 442 includes a CI type field 444, a file path field 446, a save content radio 448, and an active tracking radio 450. Changes via the tracked file definition box 440 may be saved to the tracked file screen 404 via a save button 452 or may be canceled without saving to the tracked file screen 404 by clicking a cancel entry button 454.

Figure 8:
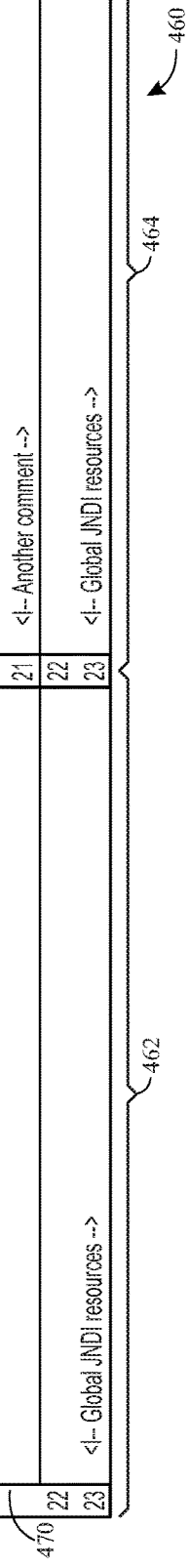
FIG. 8 illustrates a comparison screen comparing a first version of a configuration file to a second version of the configuration file, in accordance with an embodiment.

Once a configuration file is tracked with content saved, a current configuration file may be compared to a previous configuration file. FIG. 8 illustrates an embodiment of a comparison screen 460 comparing a first version 462 of a configuration file to a second version 464 of the configuration file. The specific configuration file may be identified using a configuration file identifier 466. In the illustrated embodiment, the configuration file identifier 466 includes the file path to the configuration file. Additionally or alternatively, the configuration file identifier 466 may include other identification, such as a human-readable label. In some embodiments, the comparison screen 460 may include highlights 468 and 470 where the first version 462 and the second version 464 of the configuration files differ. Moreover, the first version 462 and the second version 464 are saved at different times as indicated by a first save time indicator 472 and a second save time indicator 474. These highlights may be jumped between using a next difference button 476 and a previous difference button 478 by moving to a next difference or a previous difference, respectively.

Service Mapping UI

Figure 9:
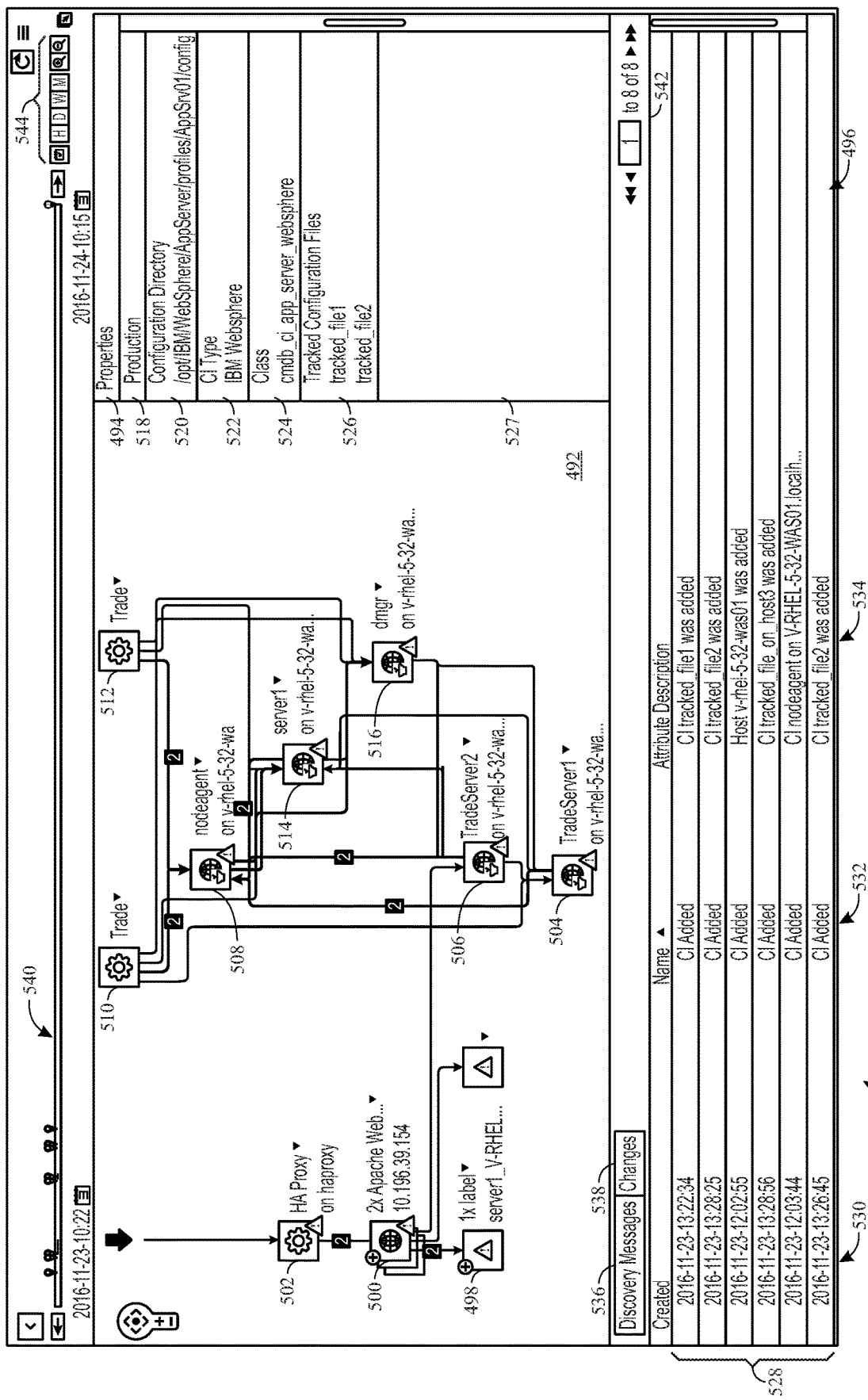
FIG. 9 illustrates a service mapping timeline used to track configuration files, in accordance with an embodiment.

Service mapping timelines 372 may be used to display an accurate, up-to-date view of infrastructure of one or more networks (e.g., IT networks). The service mapping timelines 372 may be used to view CIs that have been discovered during discovery processes. FIG. 9 illustrates a service mapping timeline 490. The service mapping timeline 490 includes a service map 492, a properties frame 494, and a changes timeline frame 496. The service map 492 includes icons 498, 500, 502, 504, 506, 508, 510, 512, 514, and 516 that each corresponds to a CI 110 that has been discovered during a discovery process. The service map 492 includes graphical illustration of interconnections between the CIs.

Upon selection of an icon from the service map, the properties frame 494 may reflect information about the selected CI and its related configuration files. For example, the properties frame 494 may include a production sub-frame 518, a configuration directory sub-frame 520, a CI type sub-frame 522, a class sub-frame 524, a tracked configuration files sub-frame 526, and a detailed properties sub-frame 527. The configuration directory sub-frame 520 indicates a directory under which configuration files for the CI may be located. The CI type sub-frame 522 indicates a CI type for the currently selected CI. The class sub-frame 524 indicates a class for the currently selected CI. The tracked configuration files sub-frame 526 includes a list of configuration files being tracked for the CI. The detailed properties sub-frame 527 may include additional details about the CI that does not fit in the categories designated for the other sub-frames.

The changes timeline frame 496 may display a list 528 of changes to tracking and/or tracked files. In some embodiments, the list 528 may include changes to any and all CIs in the service map. Alternatively, the list 528 may display changes only related to a selected CI. The list 528 details information about the changes. For example, the list 528 includes when the change occurred in a created column 530, a name for the change in a name column 532, and an attribute description of the change in an attribute description column 534.

The changes timeline frame 496 may display other information. For example, to display discovery messages (e.g., errors in discovery), a discovery message button 536 may be selected. From a display of discovery messages, the list 528 of changes may be displayed after selection of a changes button 538. In the illustrated embodiment, CIs are only added. The CIs may be visually marked as added using a visual notification, such as the exclamation point and triangle illustrated in the embodiment.

The service mapping timeline 490 may also include timeline 540 reflecting all of the changes. Clicking a location in the timeline 540 may change which changes are reflected in the list 528. Alternatively, the list 528 may be navigated using a navigation control 542. A resolution of the timeline 540 may be changed using resolution controls 544. In some embodiments, increasing the resolution may increase a number of events shown on the timeline.

Figure 10:
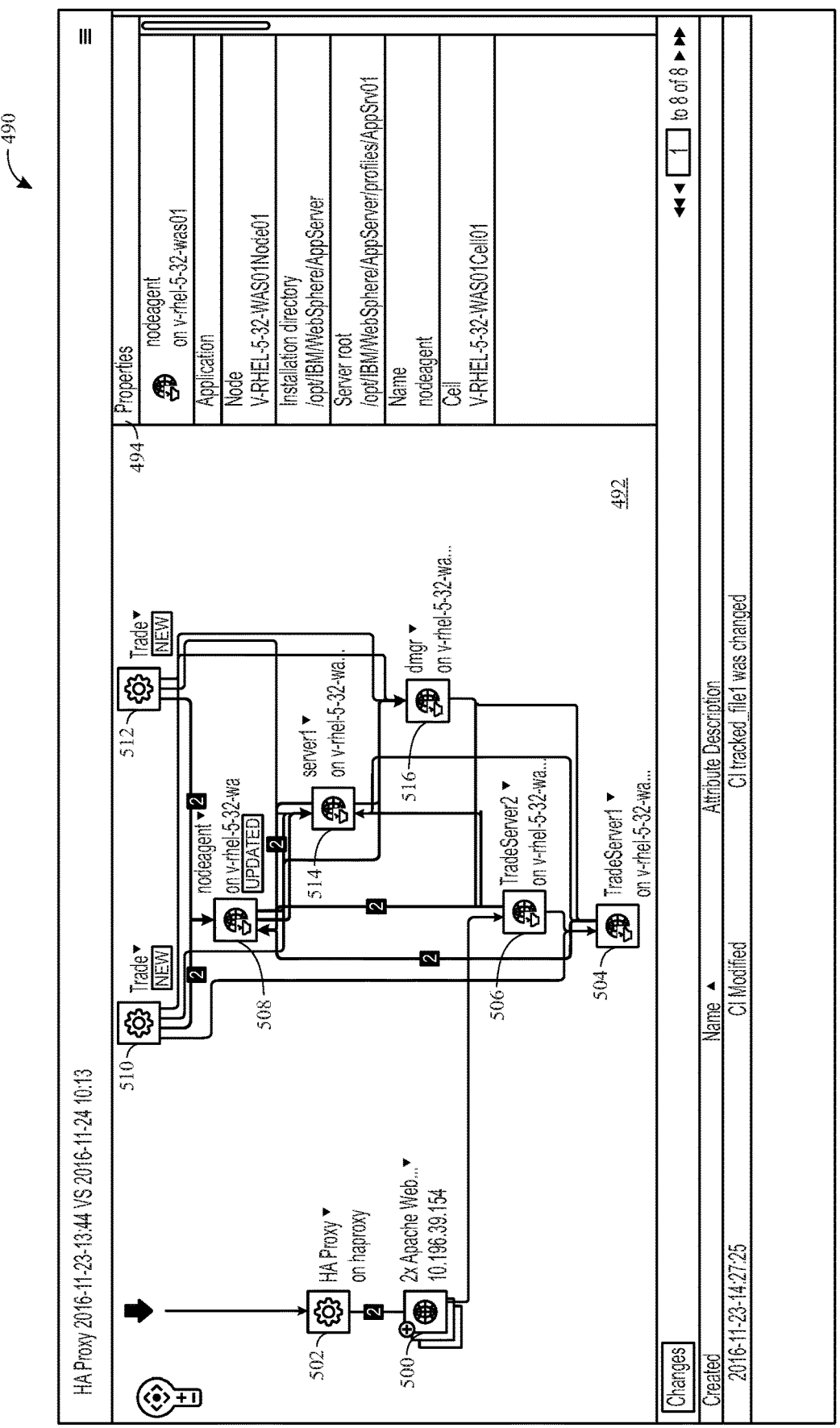
FIG. 10 illustrates the service mapping timeline of FIG. 9 at a later time illustrating a change in a configuration item, in accordance with an embodiment.

FIG. 10 illustrates the service mapping timeline of FIG. 9 at a subsequent time when the only tracked change for the selected icon 508 is an update to the CI tracked item corresponding to icon 508. In some embodiments, this update may be visually marked on the display. For example, in the illustrated embodiment, the word "UPDATED" is added next to the icon 508. However, in some embodiments, other text or icons may be used to indicate that the corresponding file has been updated. Furthermore, since the icon 508 is selected, the properties frame 494 has changed to display the properties of the CI corresponding to the icon 508.

In some embodiments, a sub-menu 546 corresponding to the update may be displayed upon a trigger condition (e.g., right mouse click on an icon (selected icon 508) or row (e.g., row 548) associated with the update). The sub-menu 546 may provide an option 550 to view the change in the tracked file content. Upon selection of the option 550, a comparison screen (e.g., similar to the comparison screen 460 of FIG. 8) may be presented, illustrating the change in the tracked file.

Manually Added CIs and Connections

Figure 11:
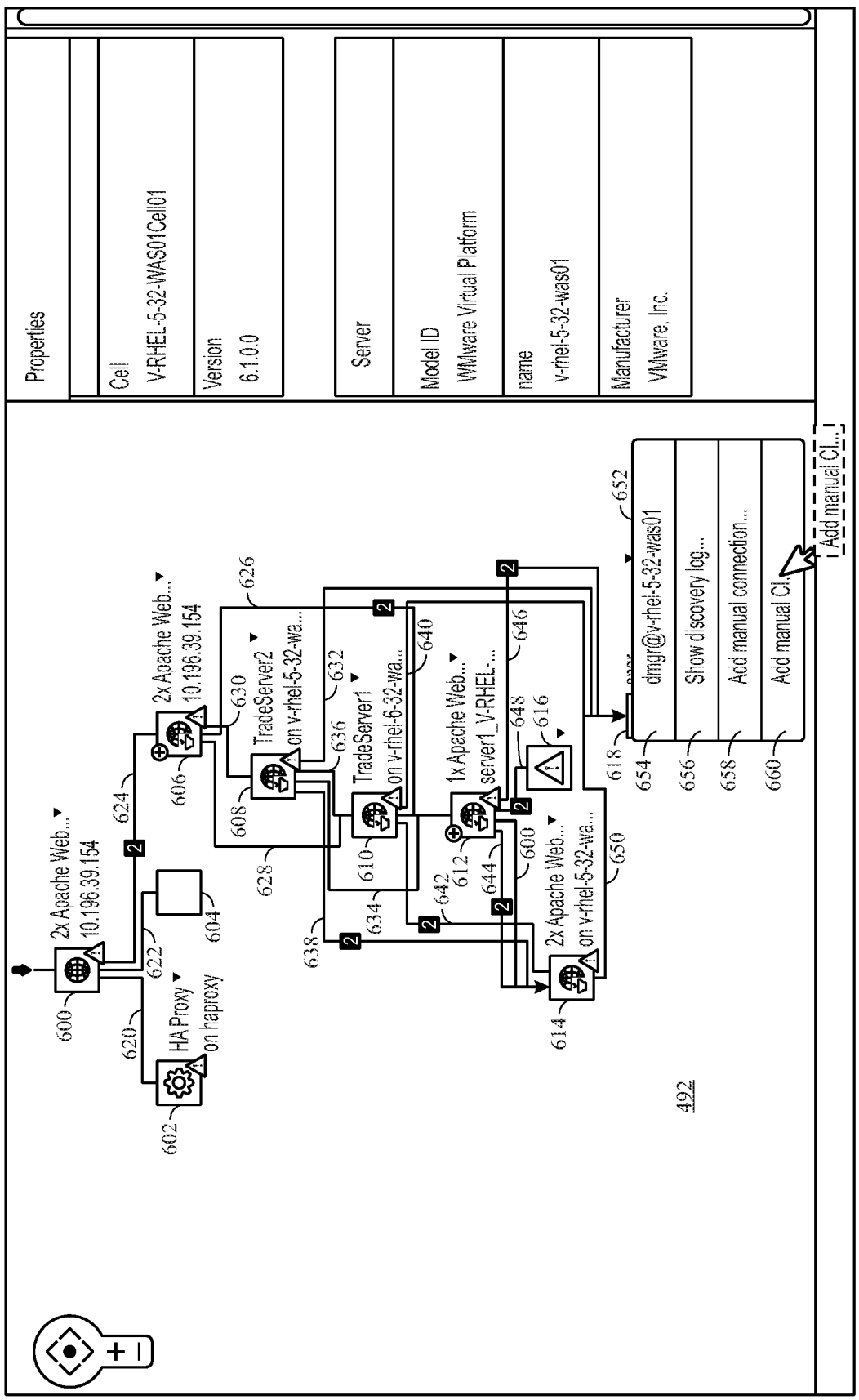
FIG. 11 illustrates manually adding a configuration item or a connection to the service map, in accordance with an embodiment.

In some embodiments, the CIs 110 and connections between CIs 110 may be manually added to the discovered CIs 110 and connections of the service mapping 492, resulting in a hybrid service map 492. That is, the service map 492 is "hybrid" in that it includes automatically discovered CIs 110 and connections as well as manually added CIs 110 and connections. FIG. 11 is illustrates manually adding a CI 110 or a connection to a service map 492. The service map 492 includes various CIs 110, which are represented by icons 600, 602, 604, 606, 608, 610, 612, 614, 616, 618. The icons 600, 602, 604, 606, 608, 610, 612, 614, 616, 618 are connected to one another by lines 620, 622, 624, 626, 628, 630, 632, 634, 636, 638, 640, 642, 644, 646, 648, 650 representing various connections between the CIs 110. As shown, one of the icons 618 has been selected (e.g., a user has right mouse clicked on the icon 618), causing a submenu 652 to display. The user may also right mouse click or take some other action anywhere on the service map 492 to cause the submenu 652 to appear. The submenu 652 includes various fields that display information about the CI 110 represented by the selected icon 618 or display options that a user may select to take action. For example, in the illustrated embodiment, the submenu 652 includes a name field 618 that displays the name of the CI 110 represented by the icon 618. The submenu 652 also includes a show discovery log button 656, an add manual connection button 658, and an add manual CI button 660. It should be understood, however, that in some embodiments, the submenu 652 may include fewer fields or buttons, additional fields or buttons, or different combinations of fields and buttons.

By selecting the show discovery log button 656, a window displaying a discovery log for the CI 110 associated with the selected icon 618 may appear. For example, the discovery log may include listings of when the CI 110 was originally discovered, subsequently updated, removed, and/or rediscovered. By selecting the add manual connection button 658, a window may appear that enables a user to enter or select a URL or endpoint. A discovery process is then started from the URL or endpoint added. By selecting the add manual CI button 660, a window appears that enables a user to manually add a CI 110 that will be connected to the selected existing CI 110.

Figure 12:
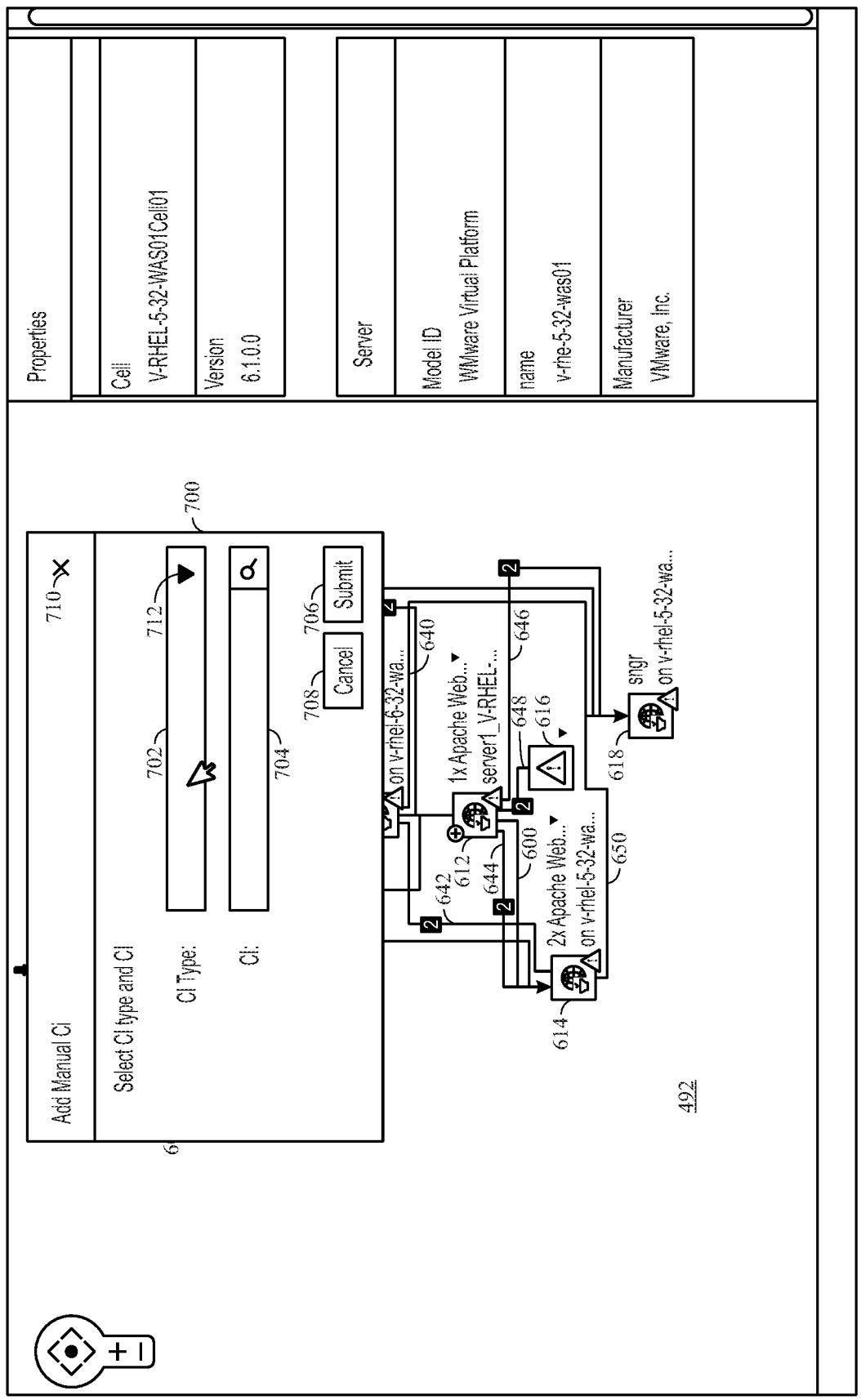
FIG. 12 is a pop-up window that appears when an add manual configuration item button is selected, in accordance with an embodiment.

FIG. 12 is a pop-up window 700 that appears when the add manual CI button 660 is selected. The window 700 includes a CI type field 702, a CI name field 704, a submit button 706, a cancel button 708, and a close window button 710. The CI type field 702 may be filled by manually entering a CI type name, or by selecting a CI type from a list of possible CI types. In the illustrated embodiment, the CI type field 702 is filled in by selecting a CI type from a drop down list. For example, selecting the drop down arrow 712 may cause the CI type field 702 to expand to a list of possible known CI types. The CI type selected from the drop down menu may then be displayed in the CI type field 702. To fill in the CI name field 704, the desired name of the CI is manually entered. When the CI type field 702 and CI name field 704 are filled in, the user may select the submit button 706 to create manually added CI 110 with the provided specifications, which will be connected to the selected existing CI 110 (e.g., the CI associated with the selected icon 618). The cancel button 708 may be selected to abort creation of the manually added CI 110, close the window 700, and return to the service map 492. Similarly, the close window button 710 may be selected to close the window 700 without creating the manually added CI 110 and return to the service map 492 without saving any entered data.

Figure 13:
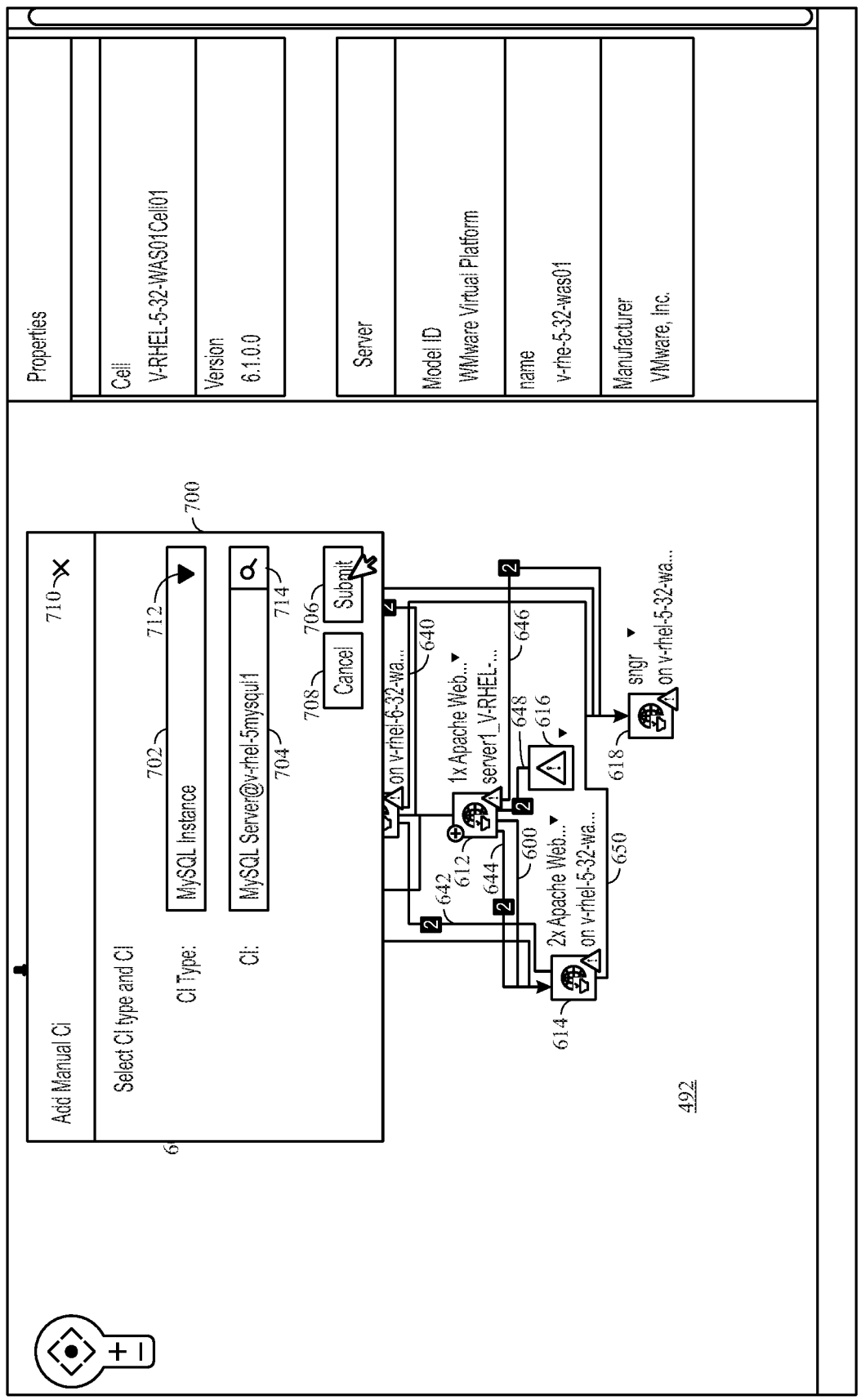
FIG. 13 is the pop-up window of FIG. 12 with a configuration type field and configuration item name field filled in, in accordance with an embodiment.

FIG. 13 is the pop-up window 700 of FIG. 12 with the CI type field 702 and CI name field 704 filled in. As shown, in the instant embodiment, the manually added CI type is a MySQL instance and the manually added CI 110 has been named "MySQLServer@v-rhel-5-mysql1". In some embodiments, the window 700 may include a search button 714 which, when selected, triggers a search for the CI name specified in the CI name field 704. For embodiments of the window 700 that include the search button 714, the search button 714 may be present at all times, or only after the CI name field 704 has been filled in.

Figure 14:
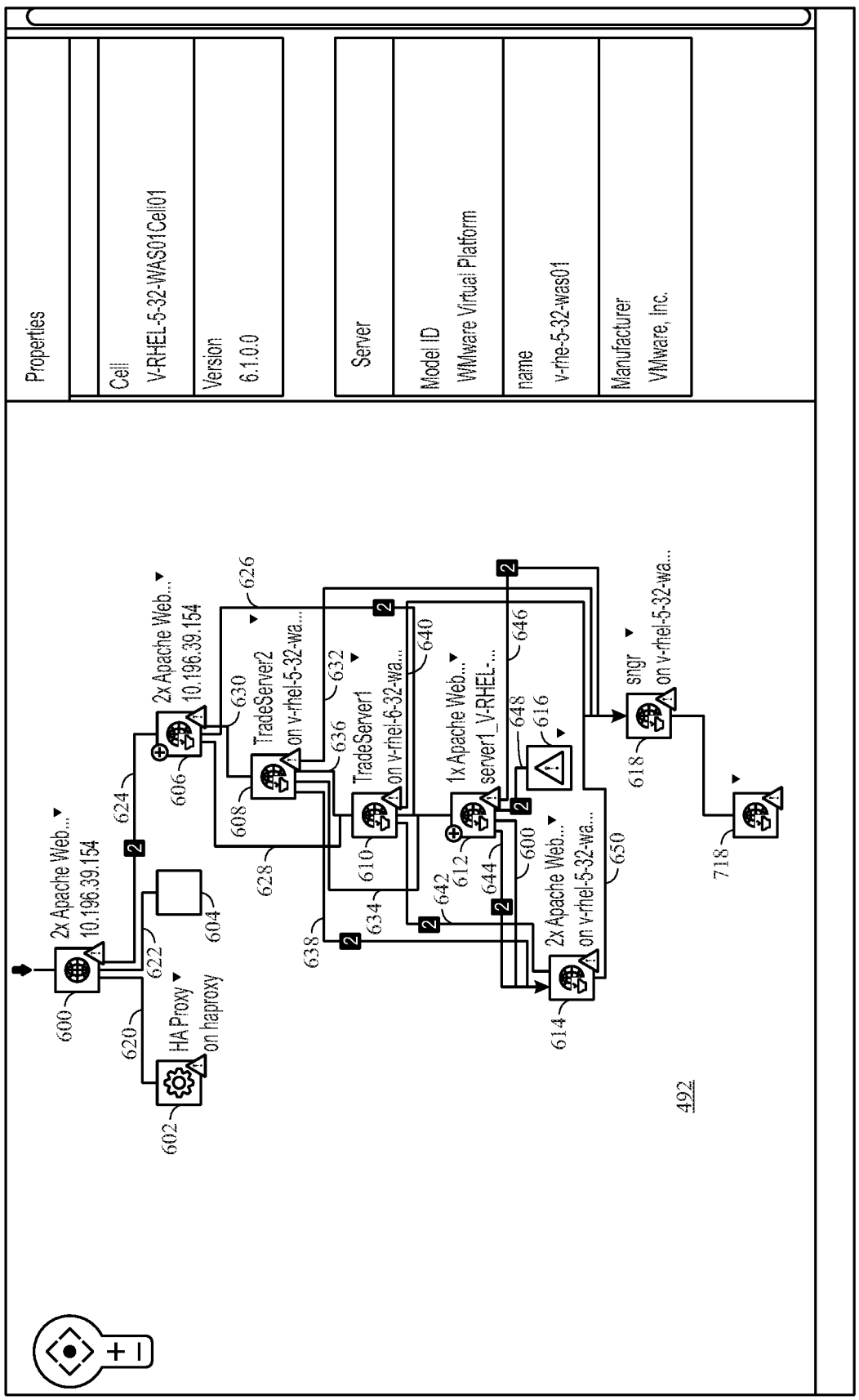
FIG. 14 is a service map that includes an icon that represents the manually added configuration item, in accordance with an embodiment.

FIG. 14 is a service map 492 that includes an icon 718 representing the manually added CI 110. As shown in FIG. 13, in the instant embodiment, the manually added CI 110 is MySQL CI, however, any type of CI may be added manually. Further, because icon 618 was initially selected (e.g., right mouse clicked), a line extends between the icons 618, 718, indicating a connection between the CIs 110 represented by icons 618 and 718. Additional connections may be added manually through a similar process, or via discovery.

Figure 15:
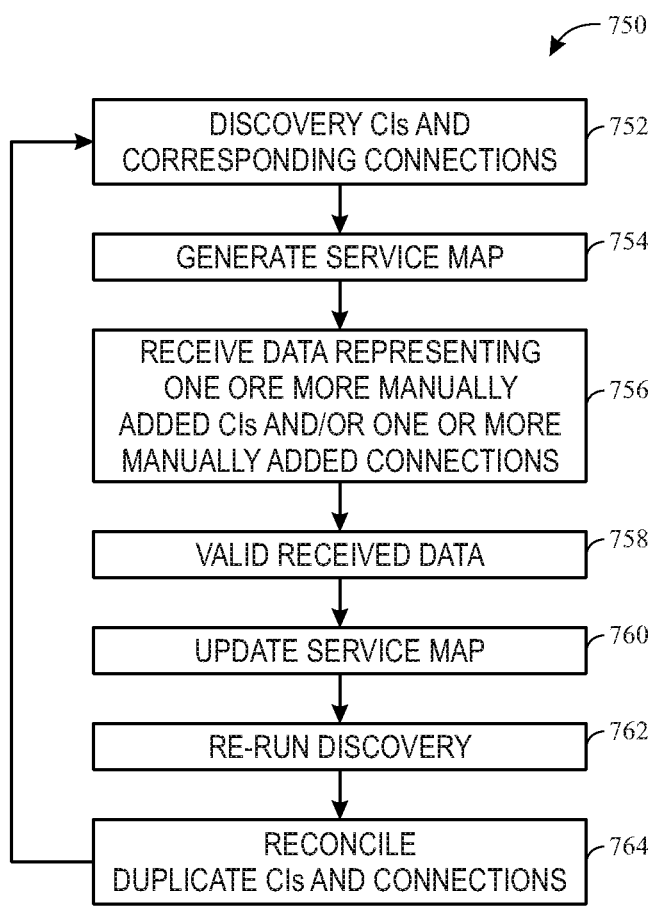
FIG. 15 is a flow chart of a process for manually adding the configuration item or connections between configuration items to the service map that includes discovered configuration items and/or connections, in accordance with an embodiment.

FIG. 15 is a flow chart of a process 750 for manually adding a CI 110 or connections between CIs to a service map that includes discovered CIs 110 and/or connections. In block 752 one or more CIs 110 and/or one or more connections between CIs are discovered. Discovery is discussed in more detail above with respect to FIGS. 4 and 5. In block 754, a service map 492 is generated illustrating the discovered CIs 110 and corresponding connections. As shown in FIGS. 9-14, the service map 492 is a visual representation of components connected to a network. The service map 492 includes a number of icons, each corresponding to a CI 110, and lines disposed between the icons, which represent connections between the CIs 110.

In block 756, data is received that represents one or more manually added CIs and/or one or more manually added connections between CIs. As described with regard to FIGS. 9-14, this may include selecting (e.g., right mouse clicking) a part of the service map 492, and then selecting the add manual CI button 660 and/or the add manual connection 658 button from the submenu 652. A pop up window 700 appears prompting a user to enter information corresponding to the manually added CI or connection. In block 758, the received data is validated, confirming that the manually added CI and/or connection data provided is correct.

At block 760, the service map 492 is updated to reflect the one or more manually added CIs and/or the one or more manually added connections. This may include, for example, adding icons to the service map 492 that represent the one or more manually added CIs and/or lines representing the one or more manually added connections.

At block 762 discovery may be re-run. In some embodiments, manually added CIs or connections may be discovered during discovery. To reduce redundancy, duplicate CIs and/or connections (e.g., manually added CIs and connections that are subsequently discovered) may be reconciled. For example, the process 750 may recognize which CIs were manually added and only display a single icon, rather than one icon for the manually added CI and a second icon for a discovered instance of the same CI. Discovery may be re-run on a schedule or based on triggering events as components are added to, or removed from, the network. As components and corresponding connections are added to or removed from the network (e.g., manually or via discovery), the service map 492 of the network may be updated accordingly.

Discovery Error Resolution

Figure 16:
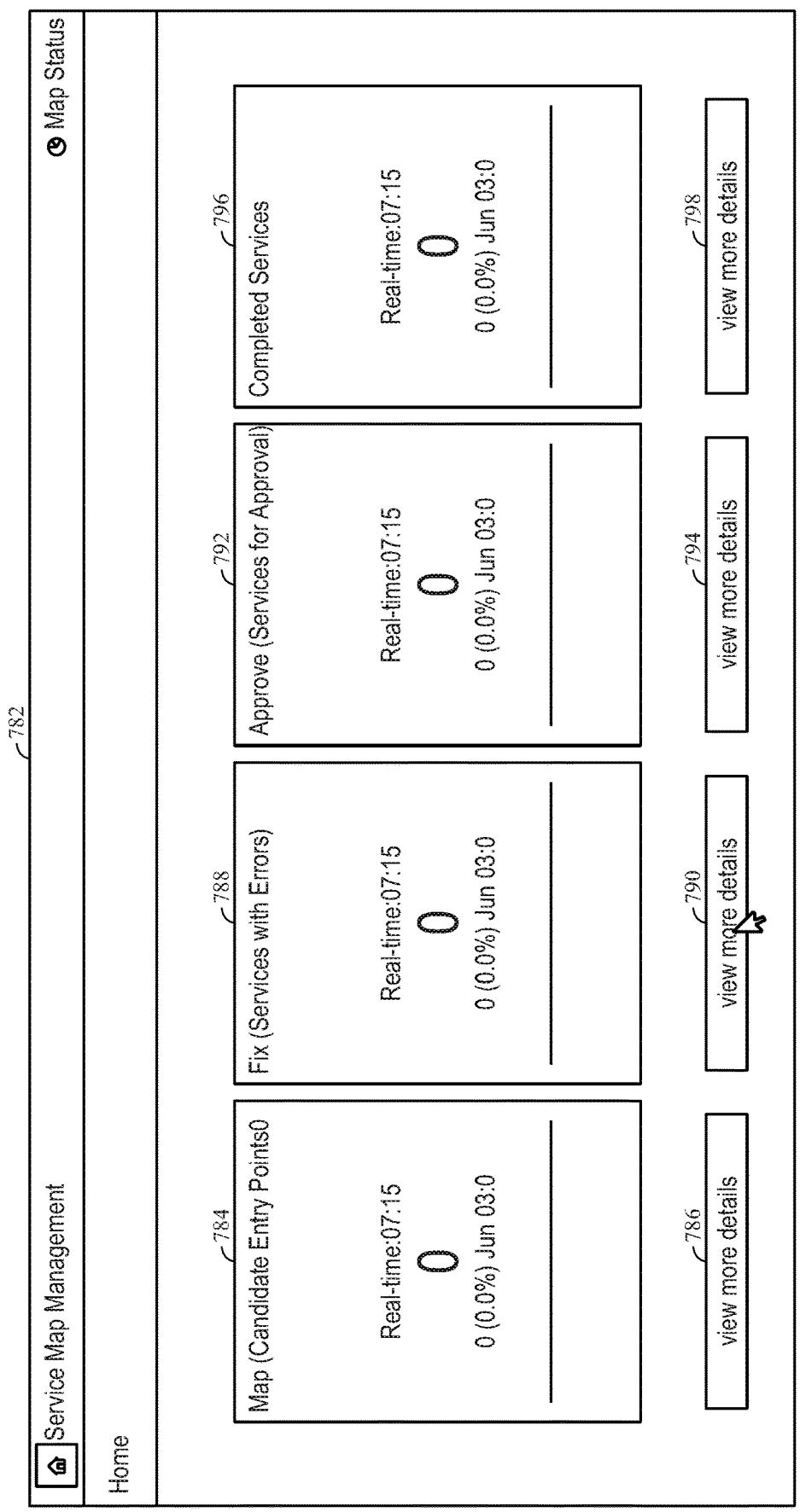
FIG. 16 is a service map management home screen, in accordance with an embodiment.

In some embodiments, errors may arise during discovery. For example, known components may not be found, unrecognized components may appear, one or more of the connected components may give rise to issues during discovery, etc. FIG. 16 is a service map management home screen 782. The service map management home screen 782 includes a map window 784, a view more map details button 786, a fix window 788, a view more fix details button 790, an approve window 792, a view for approval details window 794, a completed services window 796, and a view more completed services details button 798. To view a summary of errors arising during discovery, the view more map details button 786 may be selected. When the view more map details button 786 is selected, a service map management map screen appears.

Figure 17:
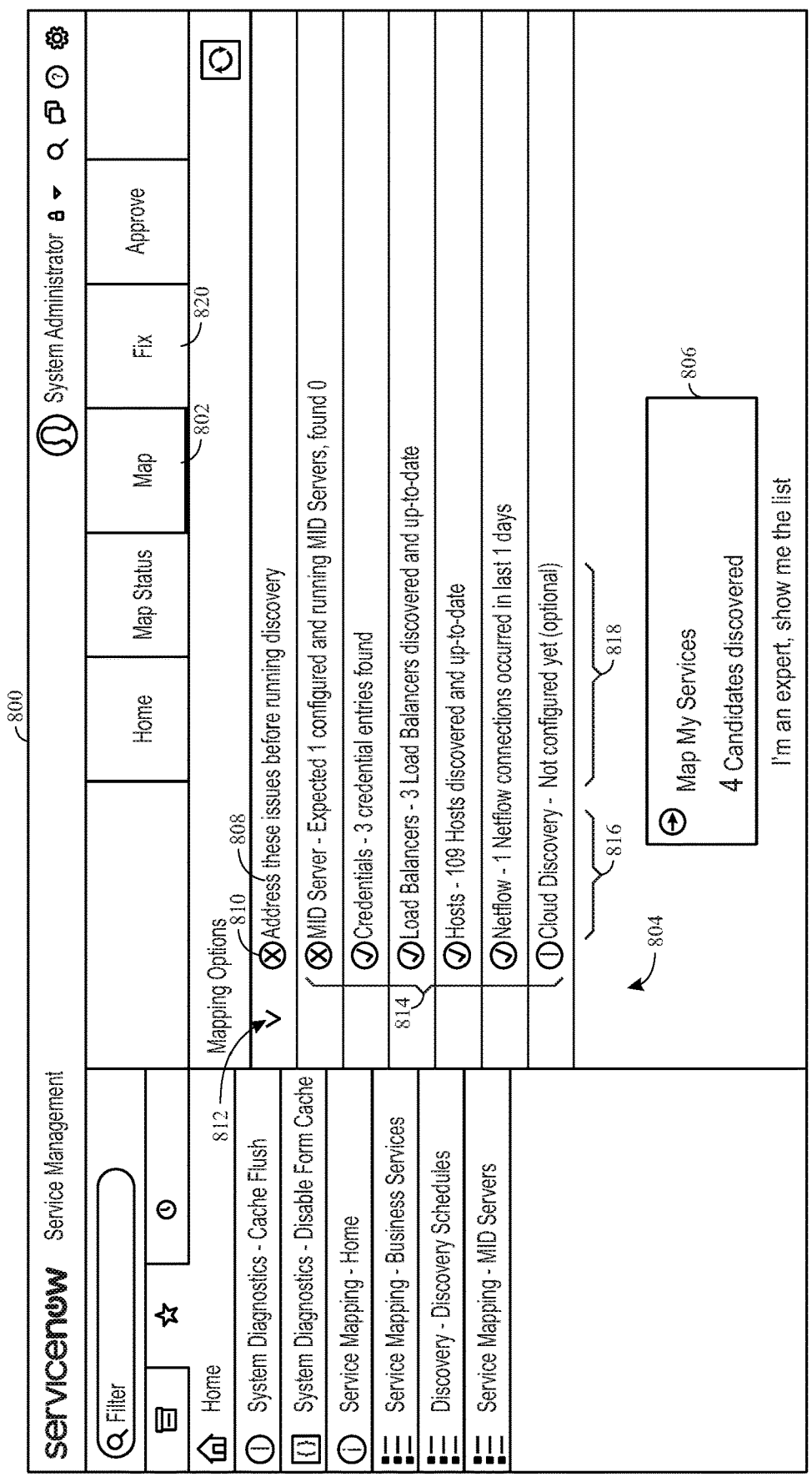
FIG. 17 is a service map management map screen that appears when a view more fix details button is selected from the service map management home screen of FIG. 16, in accordance with an embodiment.

FIG. 17 is an embodiment of the service map management map screen 800 that appears when the view more map details button 790 is selected. The service map management map screen 800 includes a collapsible nested menu that enables a user to view a summary of and resolve issues that arise during discovery, if any, via a single screen. In the illustrated embodiment, the view more details button 790 below the map window 784 was selected from the service map management home screen 782 of FIG. 16. Upon selection of the view more details button 786, the service map management map screen 800 is displayed, which includes a mapping options menu 804, along with a map my services window 806. A service mapping status notification 808 at the top of the mapping options menu 804 indicates whether or not any errors have occurred. In the instant embodiment, the status notification 808 and the X icon 810 that appears next to the notification 808 indicate that errors have occurred that should be addressed before running discovery or re-running discovery. When a dropdown arrow 812 is selected, the mapping options menu 804 expands to display the various error categories. In the illustrated embodiment, the error categories include MID servers 126, credentials, load balancers 118, hosts, netflow, and cloud discovery. Each error category listing includes an icon 814, which indicates the status of each category of errors. For example, the icon may be an X icon (e.g., indicating that there are errors of this category), a check icon (e.g., indicating that there are no errors of this category), an i icon (e.g., indicating that no components that would experience this category of error have been configured). As illustrated, each error category listing includes an error category name 816 field and a status summary field 818. The error category name field displays the name of the error category. The status summary field 818 gives a concise summary of the status of the error category. For example, the status summary field may indicate how many components have been discovered, how many components were expected, whether the components have been configured, if the components are up to date, etc. The user may select an error category listing to expand the error category or select the fix tab 820 to address any errors that arose during discovery.

Once errors have been addressed, the map my services window 806 may be selected to re-run discovery. In some embodiments, errors may be interrelated such that one error gives rise to a number of other related errors and resolving one error may resolve one or more other redundant errors. As such, a user may or may not wish to resolve all of the listed errors before selecting the map my services window 806. In the illustrated embodiment, errors have arisen with respect to MID servers and credentials. Selecting the credentials listing causes a credentials error summary screen to be displayed.

Figure 18:
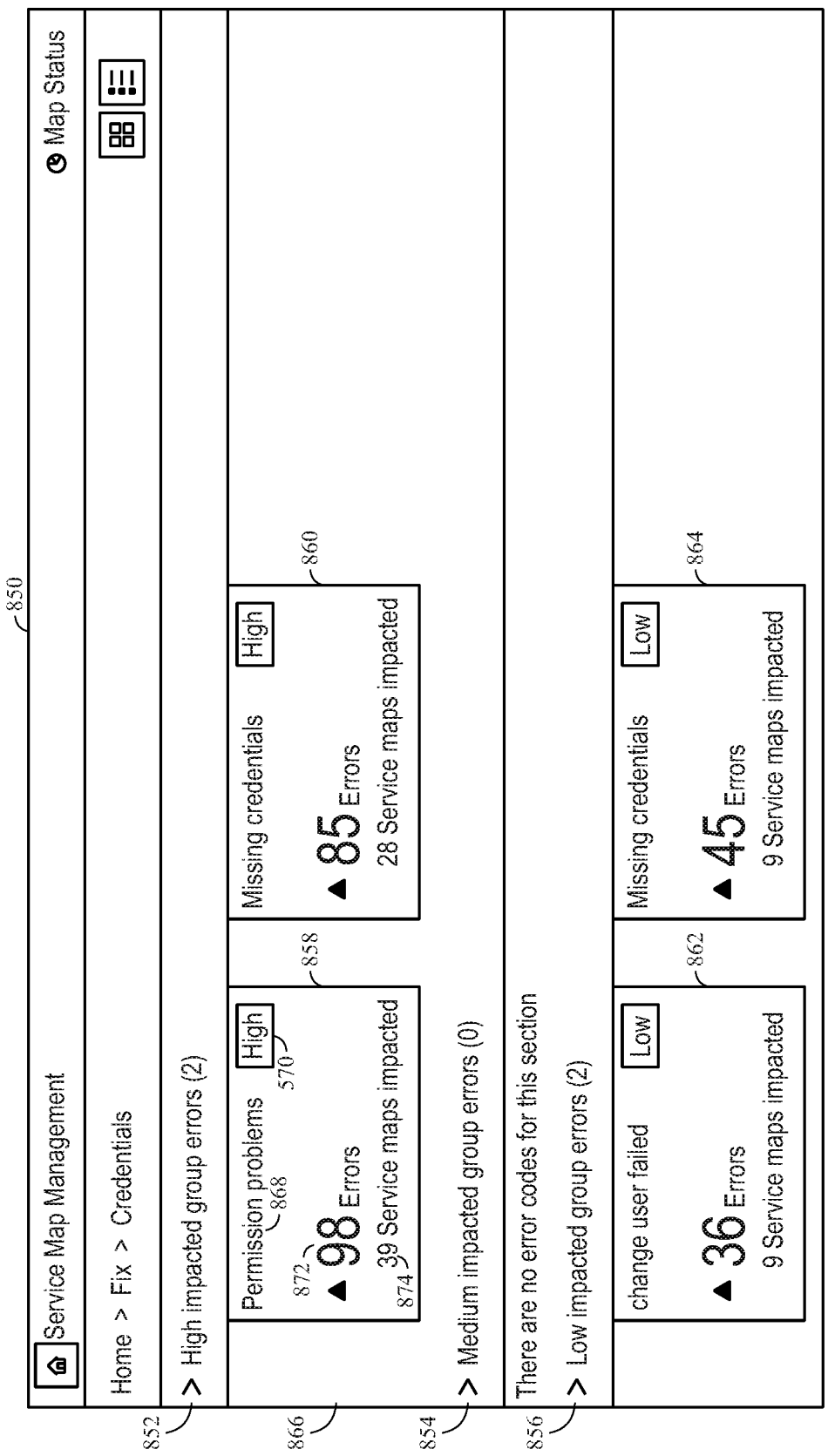
FIG. 18 is a credentials error summary screen that appears when a credentials listing is selected, in accordance with an embodiment.

FIG. 18 is the credentials error summary screen 850 that appears when the credentials listing is selected. As illustrated, credentials-related errors are broken down into high impacted group errors 852, medium impacted group errors 854, and low impacted group errors 856. Within each group, errors may be further broken down into subgroups. For example, in the instant embodiment, high impacted group errors 852 have been broken into a permission problems subgroup 858 and a missing credential subgroup 860. Similarly, the low impacted group errors 856 have been broken into a change user failed subgroup 862 and a Wmi authentication failed subgroup 864. The window for each subgroup displays the name of the subgroup, an impact rating, a number of errors, and a number of service maps impacted by the errors. For example, the permission problems subgroup window 866 includes the name 868 of the subgroup (e.g., "permission problems"), a high impact rating 870, a number of errors 872 in the subgroup (e.g., 98 errors), and the number of service maps impacted 874 (e.g., 39 service maps). Though the subgroups shown include a large number of errors (e.g., the permission problems subgroup 858 lists 98 errors), as previously discussed, multiple errors may stem from a single problem. Thus, taking remedial action to resolve the single problem may resolve multiple errors. Accordingly, though the credential error summary screen lists more than 200 errors, a few remedial actions may resolve all or most of the listed errors.

Figure 19:
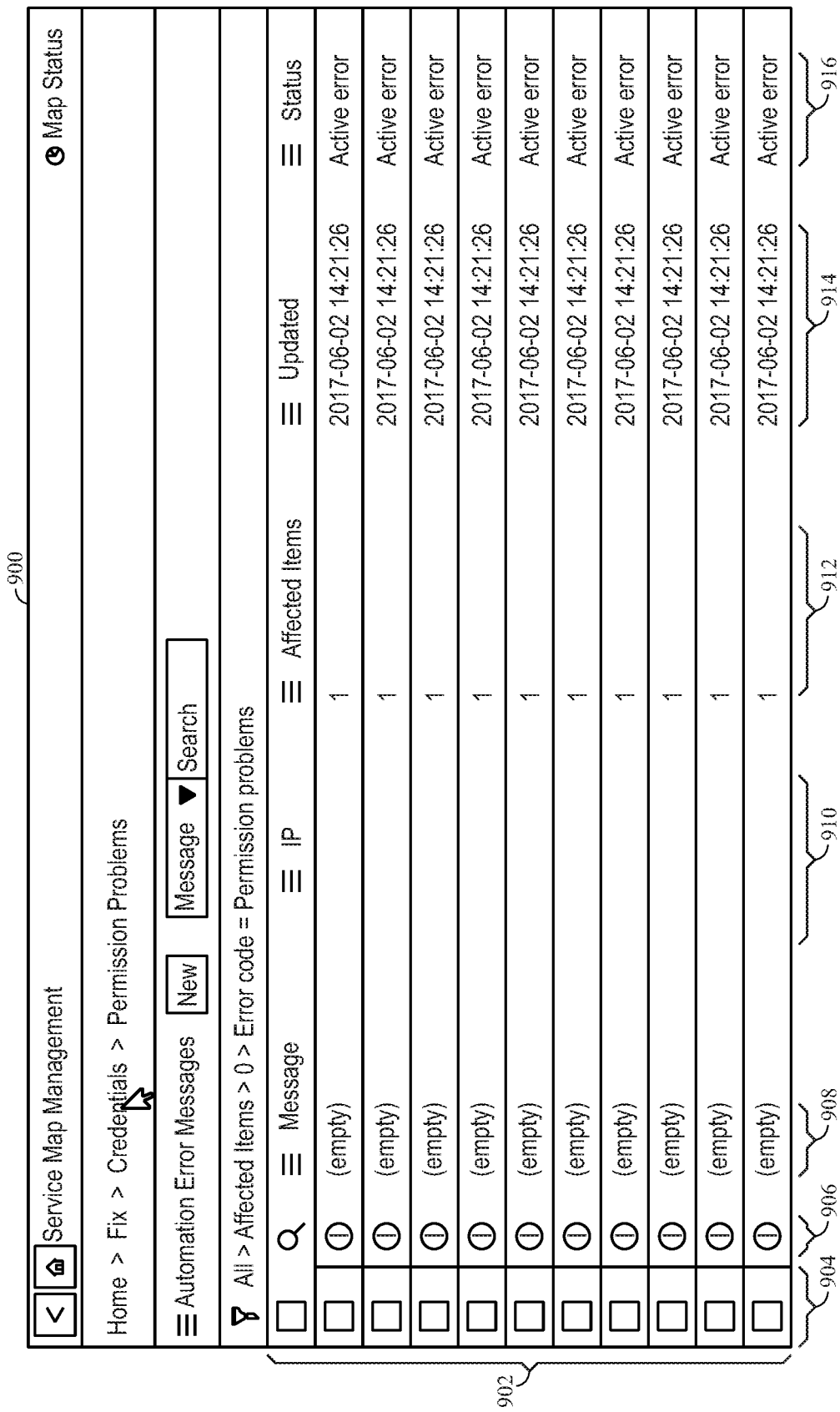
FIG. 19 is an error list window that is displayed when a subgroup is selected, in accordance with an embodiment.

By selecting one of the subgroups 858, 860, 862, 864, an error list window may be displayed. FIG. 19 shows one embodiment of the error list window 900 that is displayed when one of the subgroups (e.g., the permissions problems subgroup 858) is selected. As shown, the error list window 900 includes a scrollable list of errors 902. The scrollable list of errors 902 includes a check box column 904, an icon column 906, an error message column 908, an IP address column 910, an affected items column 912, a last updated timestamp column 914, and a status summary column 916. Accordingly, each error listing includes a check box 904, an icon 906, an error message 908, an IP address 910, a number of affected items 912, a last updated timestamp 914, and a status summary 916. The error message 908 of each error listing may be selected to view the selected error and take remedial actions to address the error. Though the error message 908 for each listed error is shown as "(empty)", in actual use, the error message column 908 would be filled in with actual error messages describing errors arising during discovery. Similarly, though no IP addresses are shown in the IP address column 910, in application, the IP address of the affected component would be listed. By using the check box column 904, multiple error listings may be selected, viewed, and addressed in bulk. As previously discussed, it should be understood that a single remedial action may address and resolve multiple associated error listings. Once an error has been resolved, the status summary 916 of each error listing may indicate that the error is no longer active. In some embodiments, the icons (e.g., i icons) may be selected for assistance and/or suggestions for how to address the selected error.

Figure 20:
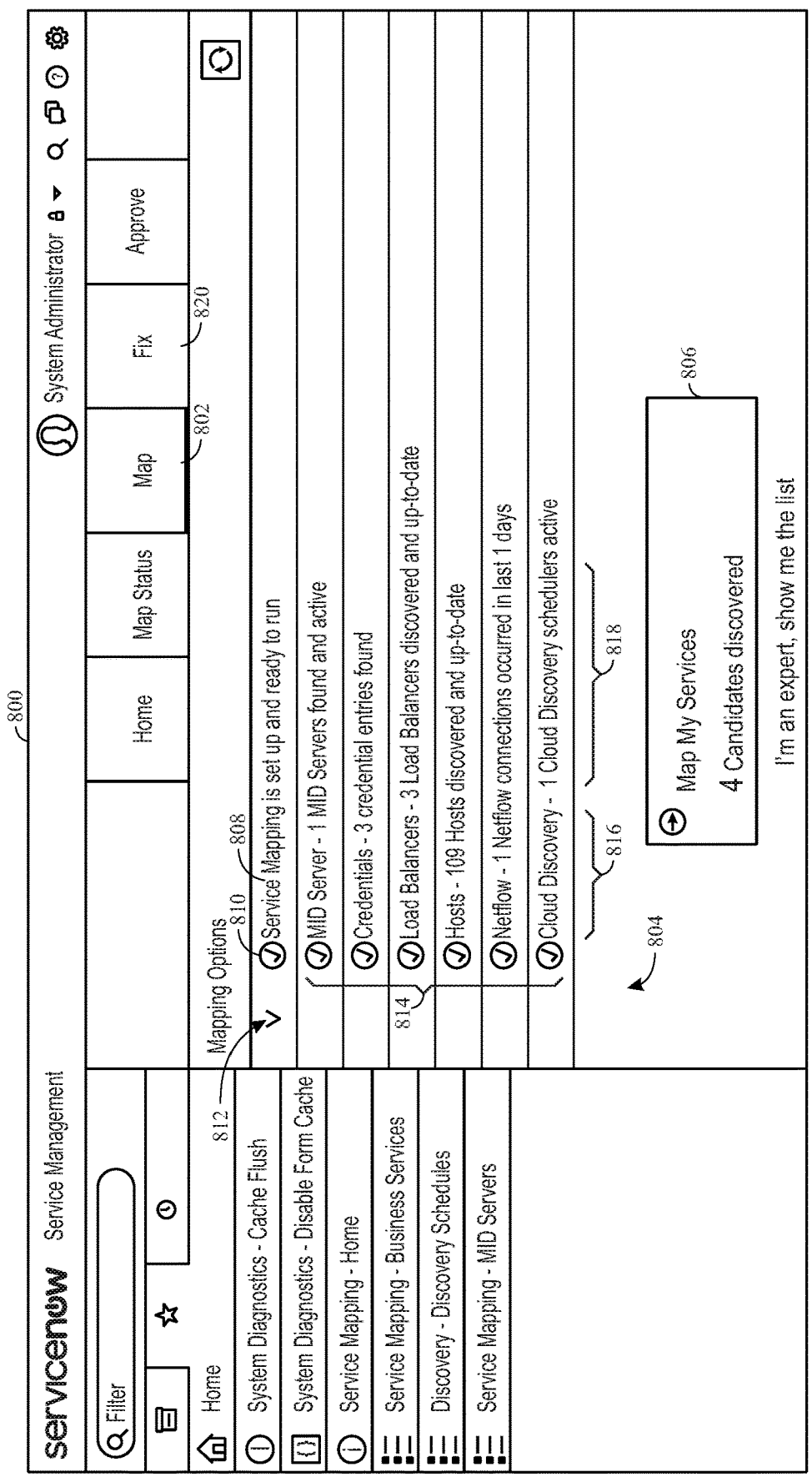
FIG. 20 is the service map management map screen of FIG. 17 when all errors have been addressed or there are no active errors, in accordance with an embodiment.

FIG. 20 is an embodiment of the service map management map screen 800 when all errors have been addressed or there are no active errors. As compared to the service map management screen 800 of FIG. 17, the icon 810 and the status notification 808 indicate that there are no active errors and that service mapping is ready to run. Further, the icons 814 next to each error category name 816, as well as the status summary 818 of each error category name 816 indicate that there are no active errors. At this point, the map my services window 806 may be selected to re-run discovery and/or generate or update the service map 492.

In some embodiments, a service provider may assist a user is resolving service mapping errors that arise. For example, a service provider may set up a supporting instance which successfully provides these services. In such an embodiment, the main production instance is referred to as the parent instance. The supporting instance is configured and runs in parallel with the parent instance providing service mapping services. The parent instance and child instance work in conjunction to provide full instance functionality.

Figure 21:
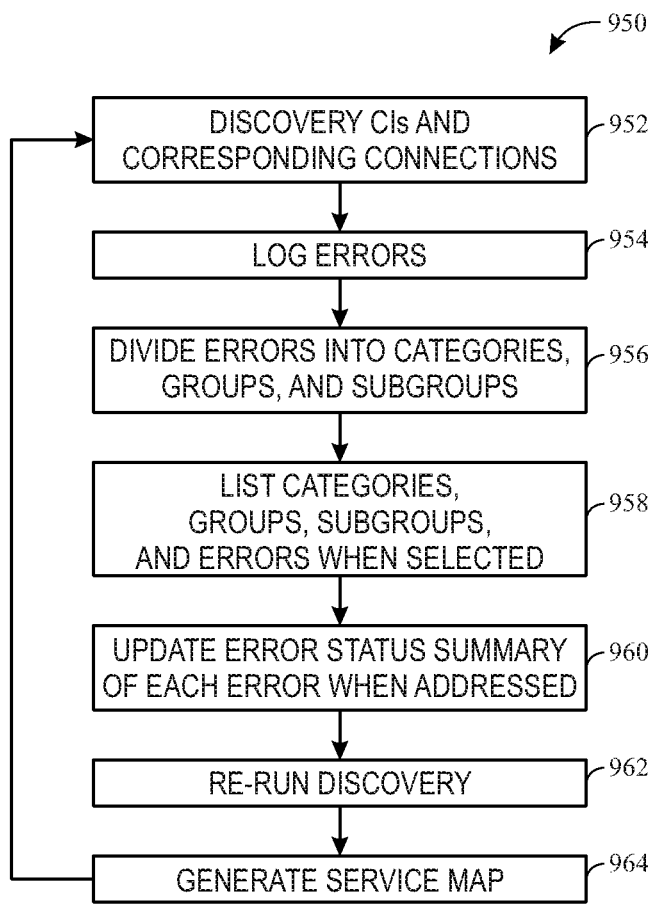
FIG. 21 is a flow chart of an embodiment of a process for discovering configuration items and corresponding connections of a network, resolving any errors arising during discovery, and generating a service map of the network, in accordance with an embodiment.

FIG. 21 is a flow chart of an embodiment of a process 950 for discovering CIs 110 and corresponding connections of a network, resolving any errors arising during discovery, and generating a service map of the network. In block 952, one or more CIs and one or more corresponding connections are discovered via a discovery process, as described with regard to FIGS. 4 and 5. At block 954, errors arising during discovery, if any, are logged. Logging errors may include tracking information such as the affected components, IP addresses of relevant components, the timestamp of the last update, etc. At block 956, the errors may be divided into categories, groups, and subgroups. For example, as described with regard to FIGS. 17 and 18, the categories may include MID servers, credentials, load balancers, hosts, netflow, and cloud discovery. The groups may include high impacted group errors, medium impacted group errors, and low impacted group errors. At block 958, error categories, error groups, error subgroups, and errors themselves may be displayed when selected as a user navigates the service map management system. Navigation of the service map management system was discussed above with regard to FIGS. 16-20. As the user navigates the service map management system and takes remedial action to address the errors that arose during discovery, the error status summary of each error is updated. At block 962, the discovery process is run again. In some embodiments, the discovery process is re-run when all of the errors have been addressed. In other embodiments, the discovery process is re-run when some of the errors have been addressed. At block 964 a service map is generated, which may include one or more icons representing one or more components (e.g., CIs) connected to the network, and one or more lines representing one or more connections between components. As discussed above, the service map may assist users in visualizing, setting up, and maintaining the network.

Scalability Testing

Figure 22:
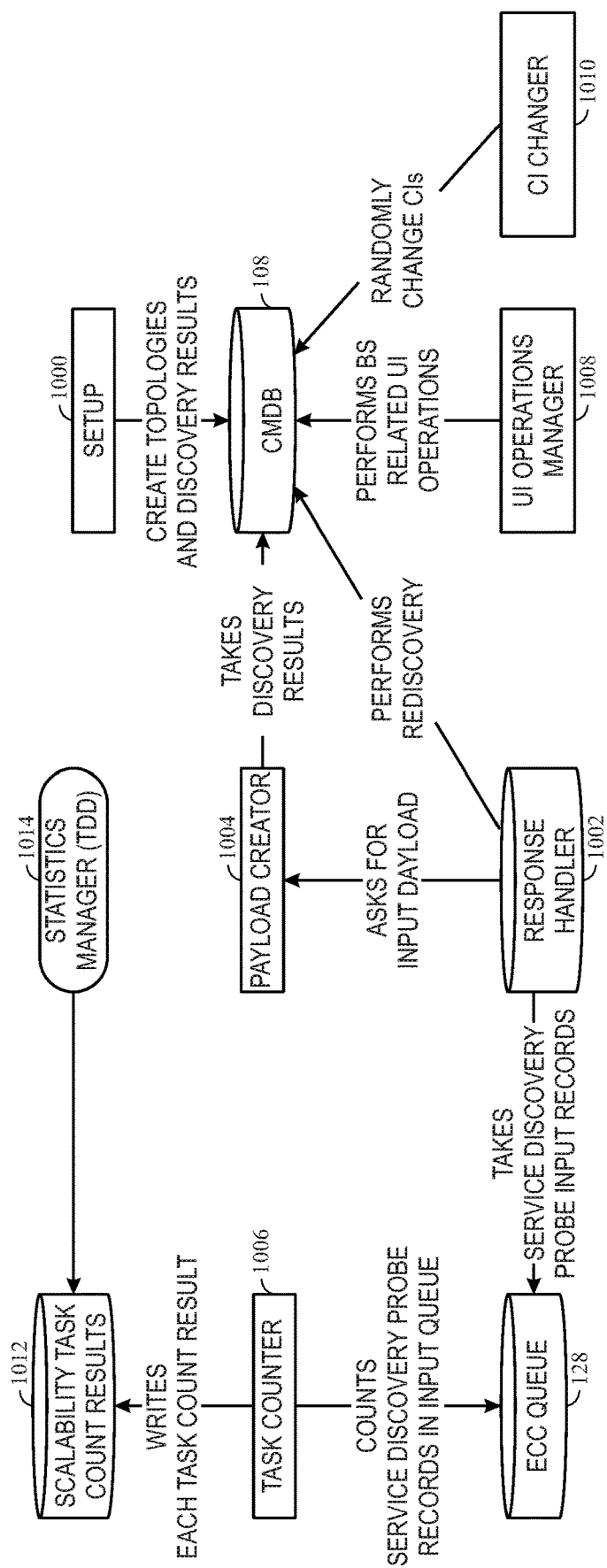
FIG. 22 is a flow chart illustrating scalability testing of the network, in accordance with an embodiment.

FIG. 22 is a flow chart illustrating scalability testing of a network. Performing scalability testing helps determine the scalability of the network, and also helps identify bottlenecks in the network, as well as slow queries that are slowing the network down. As such, the scalability testing acts as a kind of stress test of the network. To initiate the scalability testing, a script is run that includes a set number (e.g., benchmark) of tasks. Based on how long it takes the network to respond to a set number of tasks (e.g., 100,000 tasks), especially how long it takes specific parts of the network to respond to specific tasks, a determination may be made as to the scalability of the network and how to improve the scalability of the network. The number of tasks of a scalability test (e.g., a benchmark number of tasks) and how those tasks are distributed across different types of tasks, may be automatically or manually updated at regular intervals (e.g., daily, weekly, monthly, quarterly) or irregular intervals (e.g., in response to certain events (e.g., network maintenance, addition or removal of components, etc.). Updates to the benchmark number of tasks may be based on previous scalability test results, network size, network load, or a combination thereof.

In the instant embodiment, a script is created by and/or stored on a setup module 100. The various tasks may be distributed across components connected to the network. For example, the script may include tasks for a network having 200 MID Servers, 5,000 business services (25 per MID server), 80,000 IP ranges (16 per service, 400 per MID server), 80,000 server CIs (16 per service), 110,000 application CIs (22 per service), 110,000 endpoints (22 per service), 75,000 network paths (15 per service), and 250,000 records in cmdb tcp table (50 per service). It should be understood, however, that the disclosed techniques may be applied to networks having other combinations of components. The types of CIs connected to the network may include, for example, F5 Load Balancer CIs (cmdb_ci_lb_f5_1tm), Apache CIs (cmdb_ci_apache_web-_server), Application Cluster CIs (cmdb_ci_application-_cluster), Websphere CIs (cmdb_ci_app_server_web-sphere), Websphere EAR CIs (cmdb_ci_app_server_ws_ear), Oracle DB CIs (cmdb_ci_d-b_ora_instance), Linux Server CIs (cmdb_ci_linux_server), Windows Server CIs (cmdb_ci_windows_server), etc. The endpoint types may include HTTP endpoints (cmdb_ci_end-point_http), Outbound cluster endpoints (cmdb_ci_endpoin-t_ob_cluster), TCP endpoints (cmdb_ci_endpoint_tcp), EAR inclusion endpoints (cmdb_ci_endpoint_j2ee_ear), Oracle DB endpoints (cmdb_ci_endpoint_oracle_db), etc.

Traffic-based connections between CIs may include, for example, 5 traffic based connections from each Apache CI and 5 traffic based connections from each EAR CI. Each traffic based connection may be represented by a record in the cmdb_tcp table with type "to" that has IP and PID. For example, the system may generate 250K IPs (50 IPs per service-5 IPs for each Apache CI and EAR CI) and 100K PIDs (20 per service-PID and parent PID for each Apache CI and EAR CI). One specific embodiment of CIs and connections is discussed below with regard to FIG. 23.

Within the setup module 100, CIs 110 and endpoints may utilize the following naming convention "typeLabel_midId-_serviceId_ciId". The "typeLabel" describes the type of the CI (e.g., "apache", "http", "ora" etc). The "midId" describes the serial number of the MID server 126 (e.g., 1-200). The "serviceId" described the serial number of the service (e.g., 1-5000). The "ciId" describes the serial number of the CI/Endpoint (e.g., 1-5). For example, the name of an Apache CI, with a MID server serial number of 1, a service serial number of 1, and a CI serial number of 5 would be named "Apache_1_1_5".

The setup module 1000 also includes a scalability discovery results table (e.g., "sa scalability discovery restults table"), which holds a mapping between endpoint id and the discovery result to be used by a response handler 1002 script. Fields of the discovery results table may include, for example, "endpoint id" and "discovery result: should be max size".

As previously described, various components may be connected to the network and identified by the setup module. These components may include, for example, F5 load balancers, Apache CIs, Websphere CIs, Websphere EARs, Oracle DBs, Linux/Windows servers, various CI endpoints, etc. F5 Load Balancers may be identified according to the naming convention "sys_class_name" and/or by "ip_address". The port default setting for the F5 Load Balancers may be 8080. The Apache CIs may be identified according to the naming convention "sys_class_name" or by "config_file", which may be the same as the name of the CI, where the version default value is 1. The Websphere CIs may be identified according to the naming convention "sys_class_name". The node field default value may be "node", and the cell field default value may be "cell". The Websphere EARs may be identified according to the naming convention "sys_class_name". The Oracle DBs may be identified according to the naming convention "sys_class_name". The SID field is equal to the Oracle DB CI name. Linux/Windows servers may be identified by "ip_address", by "mac_address", or by serial number. The default mac address may be set to "ffff:ffff:fff:fff". The serial_number may be equal to the IP address. The http endpoint CI (e.g., cmdb_ci_endpoint_http) may be identified by "ip_address". The default value for the port field may be 8080, the default value for the protocol field may be HTTP, the default value for the host field may be "host", the default value for the host name field may be "host", and the default url may be "http://host:8080". The OB cluster endpoint CI (e.g., cmdb_ci_endpoint_ob_cluster) may be identified by "cluster_name" or "endpoint_class". The TCP endpoint CI (e.g., cmdb_ci_endpoint_tcp) may be identified by "ip_address". The value of the port field may be equal to 80 plus the ID number of the endpoint. The host field and the host name fields may both have default values of "host". The j2ee EAR endpoint CI (e.g., cmdb_ci_endpoint_j2ee_ear) container field value may be equal to the container sys_id, the node field may have a default value of "node", the ear_directory_name field may have a default value of "ear_directory_name", the ear_name field may be default to "ear_name", and the server field may be default to "server". The Oracle DB endpoint CI (e.g., cmdb_ci_endpoint_j2ee_ear) may be identified by "ip_address". The schema field may have a default value of "schema", the port field may have a default value of "1521", the protocol field may have a default value of "JDBC", the host value may have a default value of "host", the instance field may have a default value of "instance", and the host_name field may have a default value of "host".

"All Applications" is a discovery schedule that runs regularly (e.g., once a day). During discovery, all endpoints are listed as "waiting for discovery". "Load Balancers" discovery also runs on a regular schedule (e.g., once a day), which may or may not be the same schedule as the "All Applications" discovery. During "Load Balancers" discovery, all load balancer endpoints are listed as "waiting for discovery". A service rediscovery scheduler runs on a more frequent regular schedule (e.g., every minute). The service rediscovery scheduler collects "waiting for discovery" endpoints and creates discovery tasks (e.g., ServiceDiscoveryProbe/output records), with a default of 20 tasks. The response handler 1002 also collects ECC queue records (e.g., ServiceDiscoveryProbe/Output) from the ECC queue 128 and creates input records (e.g., ServiceDiscoveryProbe/Input) with an appropriate payload. A wrapper class is put around the discovery results. Further, all scripts and XMILs may be put under a performance plugin. The response handler 1002 also creates a set number of tasks for each interval of time (e.g., 100 tasks every minute).

A payload creator 1004 creates ServiceDiscoveryProbe/Input records corresponding to the ServiceDiscoveryProbe/Output records. The payload creator 1004 pulls the ServiceDiscoveryProbe/Output records from the "sm scalability discovery results" table.

A task counter 1006 periodically queries the ECC queue 128 table to get the number of of ServiceDiscoveryProbe/Input records with a status listed as "processed". The task counter 1006 runs a script that causes it to query the ECC queue 128 at regular intervals (e.g., hourly). After a set number of queries (e.g., 24 queries), the task counter accumulates the results and the queries and saves the results in a table (e.g., a scalability task count results table 1012) for regression testing purposes by a statistics manager 1014. For example, the task counter 1006 may query the ECC queue 128 before the response handler 1002 runs the "All Applications" discovery.

A UI operations manager 1008 periodically sends representational state transfer (ReST) calls to a SWMapProcessor. Specifically, the UI operations manager 1008 obtains a topology map, a topology timeline, and a changes pane from the SWMapProcessor. The UI operations manager 1008 uses the sm.scalability.ui_ops field (default value of 5) as the number of services to choose. Services may be chosen randomly. The UI operations manager 1008 runs at regular intervaled (e.g., every 15 minutes).

A CI changer 1010 periodically makes changes to the application/server CIs. The CI changer 1010 uses the sm.scalability.ci_changer field (default value of 200) as the number of CIs to change. CIs are chosen randomly from svc_ci_assoc, 1 per service. The CI changer 1010 makes changes to the "short_description" field. The CI changer 1010 runs at scheduled intervals (e.g., every 6 minutes).

Figure 23:
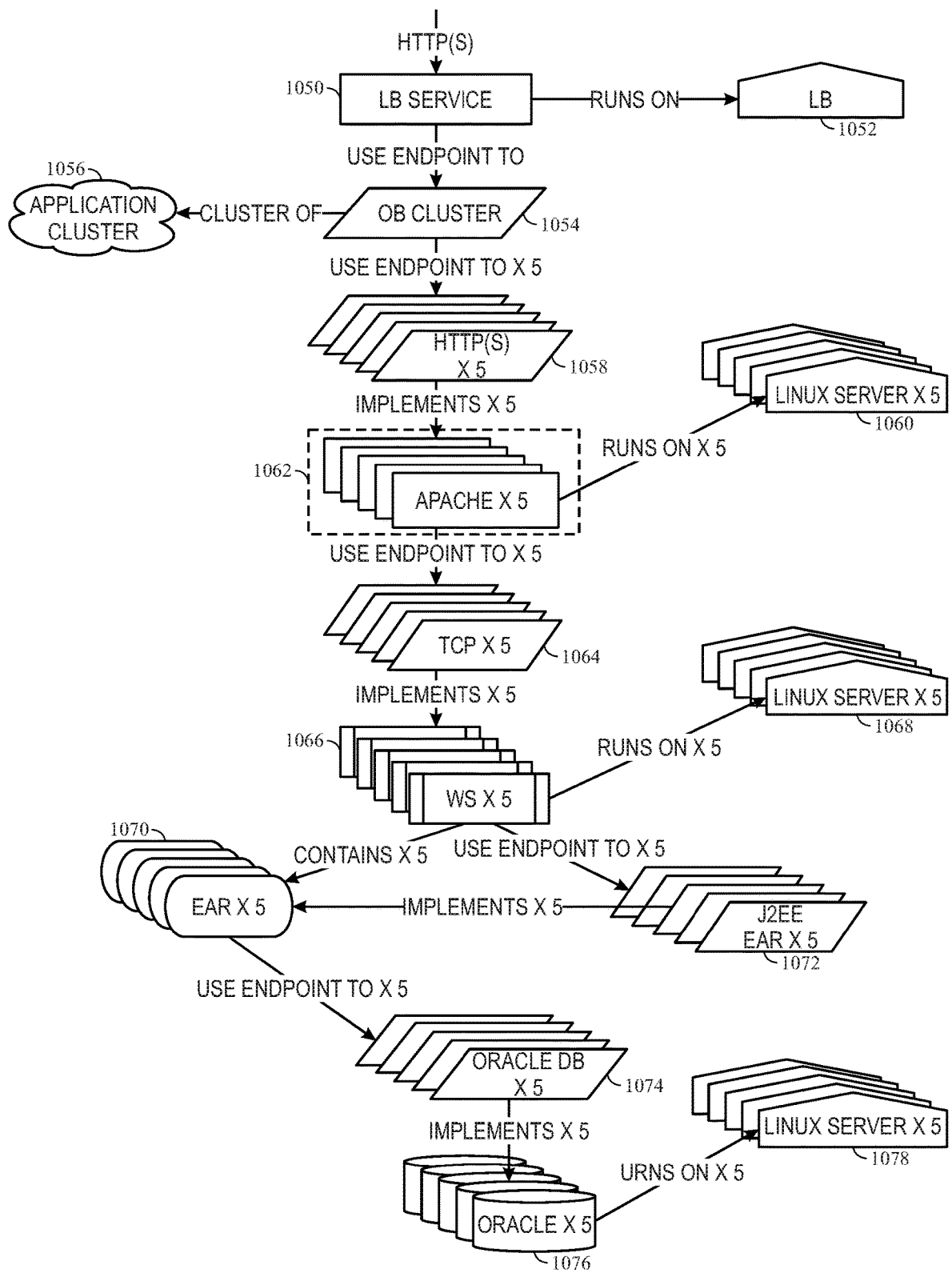
FIG. 23 is a schematic illustrating one embodiment of how components on the network interact with one another, in accordance with an embodiment.

FIG. 23 is a schematic illustrating one embodiment of how components on a network interact with one another. A load balancer module 1050 runs one or more load balancers 1052 and returns an endpoint to an outbound cluster 1054, which may be in communication with an application cluster 1056. The outbound cluster 1054 passes the endpoints to 5 HTTP server CIs 1058, which implement on 5 Apache CIs 1062. The 5 Apache CIs 1062 run on 5 respective Linux servers 1060. The Apache CIs 1062 then pass the endpoints to 5 respective TCP CIs 1064, which implement on 5 respective Windows Service CIs 1066. The Windows Service CIs 1066 run on 5 respective Linux servers 1068. The Windows Service CIs 1066 may include 5 respective EAR CIs. The endpoints are passed to 5 respective J2EE EAR CIs 1072, which implement the endpoints on the EAR CIs 1070. The EAR CIs 1070 then pass the endpoints to 5 respective Oracle DB CIs 1074, which implement the endpoints on 5 respective Oracle CIs 1076. The Oracle CIs 1076 run on 5 respective Linux servers 1078.

The disclosed techniques were used to test scalability of a network having 4 MID servers, with 400 IP ranges per MID server, 100 services, and 2100 endpoints. In one test, 100 tasks were created every minute. The tasks took 58 minutes to respond to the tasks. Worker threads were shared between scheduled jobs and sensors. This could be a result of starvation of scheduled jobs, resulting in tasks not being created and rediscovery of services delayed. In a second test, 2000 total tasks were created and executed once. Using 2 workers, creating the tasks took 36 minutes. Increasing the number of workers to 8 workers resulted in a difference of 2.5-3.0 seconds versus the 2 worker setup. Further, the configuration with 8 workers decreases the time to execute 2000 tasks as compared to the local host by approximately 15 minutes.

A service mapping interface may guide users through the workflow and recommend actions at each point in the service mapping deployment. For example, the interface may verify setup using a readiness checklist, which may verify basic service mapping resources and configurations. For missing configurations, the interface may suggested remedial actions. The interface may also allow for mapping of business services in bulk. Service mapping extracts entries directly from load balancers on the network. The extracted entries are then used to create business service candidates. All identified candidates, or selected relevant candidates, may then be mapped. The interface allows access to all major tasks via a home page. Service mapping workflow tasks may be accessed from the home page. The home page also displays important progress statistics. For example, the interface may display the number of business services discovered with errors, the number of business services waiting to be approved, and the number of business services completed. As previously discussed, suggested remedial actions may be selected to resolve errors. The system may then perform the suggested remedial actions, such as creating credentials, adding management IP, mapping in bulk and from individual business service maps, etc. The interface may also display error trouble shooting information. For example, the interface may display instructions for fixing errors in bulk directly from the map. The interface may also allow for skipping errors and continuing discovery. For example, if the CIs and connections that make up the business service are known, a user may instruct the system to continue service mapping discovery even if there are some errors. Skipped errors may be returned to later for troubleshooting such that a mostly complete mapping of a business service may be created. In some embodiments, the interface may enable users to collaborate to review, fine tune, and approve the business services. The interface may automatically create and close tasks for the business service owner as part of the review and approval workflow. As previously discussed, missing CIs (e.g., CIs that were not or could not be discovered) may be added manually. The interface may include an enhanced discovery algorithm for a less error-prone discovery process. Further, the interface may provide a user with access to TCP connection data collected by enhanced traffic-based horizontal discovery performed by discovery. A noise reduction algorithm may also be included for traffic-based discovery. The interface utilizes process identification to reduce the number of applications discovered as generic applications. Further, the interface may not display legacy discovery errors in the existing business services. After business services are rediscovered, new errors replace legacy errors.

The disclosed techniques enable a user to better maintain and manage a network of components. Service mapping discovers the business services in an organization and builds a comprehensive map of the devices, applications, and configuration profiles used in these business services. Specifically, the disclosed techniques enable a user to customize the service mapping of a network architecture by adding additional CIs and connections manually, reviewing and addressing errors that arise during discovery via a single interface, and performing scalability testing to make a determination as to the performance capabilities of the network. By enabling the addition of manually added CIs and connections between CIs, a hybrid service map may be created that includes both automatically discovered components (e.g., CIs and connections) and manually added components. Once the data representing the manually added CIs and connections have been received, the data is validated and the service map is updated to reflect the manually added components. Validating the data may help to reduce errors arising during discovery. If the manually added components arise during discovery, duplicate components may be reconciled, such than only a single icon is displayed, rather than a first icon for the manually added instance and a second icon for the discovered instance. With regard to discovery error review and resolution, errors may be grouped into categories, groups, and subgroups. A user may navigate the nested categories, groups, and subgroups via a single interface, reviewing the errors and taking remedial action to address the errors. Scalability testing may be used determine the scalability of the network, to identify bottlenecks in the network, to identify one or more slow queries, etc. As such, by determining the amount of time for the network to respond to a set number of tasks, distributed over various types of tasks, may help to make determinations as to the performance of the network, such that determinations may be made as to what, if anything, may be done to improve the performance of the network.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a non-transitory memory; and
one or more hardware processors configured to read instructions from the non-transitory memory to perform operations comprising:
initiating a discovery process to discover a plurality of configuration items within a computing network;
generating a service mapping illustrating the plurality of discovered configuration items and one or more connections between the plurality of discovered configuration items;
displaying the service mapping via a graphical user interface (GUI);
receiving, via the GUI, first input data defining a manually added configuration item;
validating the first input data of the manually added configuration item;
initiating a re-discovery process to discover a new configuration item corresponding to the manually added configuration item;
reconciling the new configuration item and the manually added configuration item; and
updating the service mapping to include a single icon that corresponds to the new configuration item and the manually added configuration item.

2. The system of claim 1, the operations comprising receiving second input data, via the GUI, wherein the second input data defines a manually added connection.

3. The system of claim 2, wherein the manually added connection is between a first discovered configuration item of the plurality of discovered configuration items and the manually added configuration item.

4. The system of claim 2, wherein the manually added connection is between the manually added configuration item and a second manually added configuration item.

5. The system of claim 1, wherein the first input data comprises a configuration item type and a configuration item name.

6. The system of claim 1, wherein the discovered configuration items and the manually added configuration item are represented in the service mapping as icons.

7. The system of claim 6, wherein the one or more connections are represented in the service mapping as lines extending between the icons.

8. The system of claim 1, the operations comprising:
generating a specified number of tasks to be performed by the one or more hardware processors based on the updated service mapping;
determining an amount of time for the one or more hardware processors to respond to the set number of tasks; and
analyzing the amount of time for the one or more hardware processors to respond to the set number of tasks to determine the scalability of the network, to identify bottlenecks in the network, to identify one or more slow queries, or a combination thereof.

9. The system of claim 1, wherein the single icon is indicative of the new configuration item.

10. The system of claim 1, wherein the single icon is indicative of the manually added configuration item.

11. The system of claim 1, the operations comprising:
displaying, via the GUI, one or more errors that arise during the discovery process, or the rediscovery process, or both, wherein the interface comprises a plurality of collapsible error categories;
receiving, via the GUI, remedial inputs resolving the one or more errors;
initiating a second re-discovery process to rediscover the plurality of discovered configuration items connected to the network and the new configuration item; and
updating the GUI to reflect that the one or more errors have been resolved by the inputs.

12. A tangible, non-transitory, machine-readable medium, comprising machine-readable instructions that, when executed by a processor, cause the processor to perform actions comprising:
initiating a discovery process to discover a plurality of configuration items within a computing network;
generating a service mapping illustrating the plurality of discovered configuration items and one or more connections between the plurality of discovered configuration items;
displaying the service mapping via a graphical user interface (GUI);
receiving, via the GUI, a first input defining a manually added configuration item;
validating the first input of the manually added configuration item;
initiating a re-discovery process to discover a new configuration item corresponding to the manually added configuration item;
reconciling the new configuration item and the manually added configuration item; and
updating the service mapping to include a single icon that corresponds to the new configuration item and the manually added configuration item.

13. The machine-readable medium of claim 12, wherein the network comprises one or more MID Servers, one or more business services, one or more IP ranges, one or more server configuration items, one or more application configuration items, one or more endpoints, one or more network paths, or a combination thereof.

14. A tangible, non-transitory, machine-readable medium, comprising machine-readable instructions that, when executed by a processor, cause the processor to perform actions comprising:
discovering a plurality of discovered configuration items connected to a network by initiating a discovery process;
generating a service mapping illustrating the plurality of discovered configuration items and one or more connections between the plurality of discovered configuration items;
displaying the service mapping via a graphical user interface (GUI);
receiving, via the GUI, input data defining a manually added configuration item;
validating the input data of the manually added configuration item;
discovering a new configuration item corresponding to the manually added configuration item by initiating a re-discovery process;
reconciling the new configuration item and the manually added configuration item;
updating the service mapping to include a single icon that corresponds to the new configuration item and the manually added configuration item;
displaying, via the GUI, one or more errors that arise during discovery, wherein the interface comprises a plurality of collapsible error categories;
receiving, via the GUI, remedial inputs resolving the one or more errors that arise during discovery;
re-discovering the plurality of discovered configuration items connected to the network; and
updating the GUI to reflect the one or more errors resolved by the inputs.

15. The machine-readable medium of claim 14, the actions comprising dividing the one or more errors into one or more categories, one or more groups, and one or more subgroups.

16. The machine-readable medium of claim 15, wherein the one or more categories comprise MID server errors, credential errors, load balancer errors, host errors, netflow errors, cloud discovery errors, or a combination thereof.

17. The machine-readable medium of claim 15, wherein the one or more groups comprise high impact group errors, medium impact group errors, low impact group errors, or a combination thereof.

18. The machine-readable medium of claim 15, wherein the one or more subgroups comprise permission problems, missing credentials, change user failed, WMI authentication failed, or a combination thereof.

19. The machine-readable medium of claim 14, wherein the GUI displays an error message, an internet protocol address, a last updated time stamp, and a status summary for each error in a selected subgroup.

* * * * *